(12) United States Patent
Emerson, III

(10) Patent No.: US 6,928,070 B2
(45) Date of Patent: *Aug. 9, 2005

(54) INTEGRATING THE INTERNET WITH THE PUBLIC SWITCHED TELEPHONE NETWORK

(76) Inventor: Harry E. Emerson, III, 27 Garden Ct., Succasunna, NJ (US) 07876

( * ) Notice: Subject to any disclaimer, the term of this patent is extended or adjusted under 35 U.S.C. 154(b) by 130 days.

This patent is subject to a terminal disclaimer.

(21) Appl. No.: 10/324,192

(22) Filed: Dec. 20, 2002

(65) Prior Publication Data

US 2003/0076819 A1 Apr. 24, 2003

Related U.S. Application Data

(63) Continuation-in-part of application No. 10/176,476, filed on Jun. 20, 2002, now Pat. No. 6,700,884.
(60) Provisional application No. 60/301,757, filed on Jun. 28, 2001.

(51) Int. Cl.$^7$ .............................................. H04L 12/66
(52) U.S. Cl. ...................................... 370/352; 370/400
(58) Field of Search ................................ 370/351, 352, 370/353, 354, 355, 356, 400

(56) References Cited

U.S. PATENT DOCUMENTS

| | | | |
|---|---|---|---|
| 5,724,412 A | 3/1998 | Srinivasan ................ 379/92.23 |
| 5,805,587 A | 9/1998 | Norris et al. ................ 370/352 |
| 5,907,547 A | 5/1999 | Foladare et al. ............ 370/352 |
| 5,937,041 A | 8/1999 | Cardillo, IV et al. ..... 379/93.25 |
| 5,995,606 A | 11/1999 | Civanlar et al. ............ 379/201 |
| 6,031,904 A | 2/2000 | An et al. ..................... 379/201 |
| 6,061,347 A | 5/2000 | Hollatz et al. .............. 370/352 |
| 6,157,648 A | 12/2000 | Voit et al. ................... 370/401 |
| 6,185,194 B1 | 2/2001 | Musk et al. ................ 370/260 |
| 6,192,045 B1 | 2/2001 | Williams et al. ............ 370/352 |
| 6,243,373 B1 | 6/2001 | Turock ....................... 370/352 |
| 6,278,704 B1 | 8/2001 | Creamer et al. ............ 370/352 |
| 6,292,480 B1 | 9/2001 | May ............................ 370/352 |
| 6,307,930 B1 | 10/2001 | Mayer ................... 379/215.01 |
| 6,324,280 B2 | 11/2001 | Dunn et al. ................. 379/230 |
| 6,327,267 B1 | 12/2001 | Valentine et al. ........... 370/466 |
| 6,333,931 B1 | 12/2001 | LaPier et al. ............... 370/385 |
| 6,381,320 B1 | 4/2002 | Creamer et al. ......... 379/201.1 |
| 6,389,038 B1 * | 5/2002 | Goldberg et al. ........... 370/471 |
| 6,490,274 B1 * | 12/2002 | Kim ........................... 370/352 |
| 6,539,077 B1 * | 3/2003 | Ranalli et al. ............. 379/67.1 |
| 6,584,093 B1 * | 6/2003 | Salama et al. .............. 370/351 |
| 6,636,596 B1 * | 10/2003 | Gallant et al. ......... 379/222.01 |
| 2001/0010690 A1 | 8/2001 | Shen .......................... 370/352 |
| 2001/0012285 A1 | 8/2001 | Shaharabani et al. ....... 370/352 |
| 2001/0032234 A1 | 10/2001 | Summers et al. ........... 709/201 |
| 2001/0055299 A1 | 12/2001 | Kelly ......................... 370/352 |
| 2002/0024943 A1 | 2/2002 | Karaul et al. ............... 370/338 |
| 2002/0041590 A1 | 4/2002 | Donovan .................... 370/352 |
| 2002/0057672 A1 | 5/2002 | Komuro ..................... 370/352 |
| 2002/0057677 A1 | 5/2002 | Katzschner et al. ........ 370/352 |

* cited by examiner

Primary Examiner—Kenneth Vanderpuye
(74) Attorney, Agent, or Firm—Ernest D. Buff & Associates, LLC; Ernest D. Buff

(57) ABSTRACT

A plurality of Integrated Devices are provided with an Internet connection and a telephone number. The telephone number has associated telephone connectivity via a telephone line, such that the Integrated Devices can be connected to by dialing the associated telephone number via telephones on the Public Switched Telephone Network (PSTN). The Internet connection has an associated Internet protocol (IP) address which is dynamically assigned when one device calls the telephone number of a called device via the PSTN. The dynamically assigned IP address for a first one of the calling or called device is provided to the other device, which initiates an Internet connection between them by sending an Internet message to the dynamically assigned IP address of the first device. Local and intermediate proxy servers perform dynamic IP address management, providing privacy and security for user IP addresses and data transmissions. Encryption keys are provided by PSTN digital messaging capabilities to calling and called devices for subsequent encryption of communications data transported across the Internet. The Internet is thereby integrated with the PSTN. Significant benefits, including the richness of Internet communications, become available by simply dialing the telephone number of suitably equipped devices or systems.

49 Claims, 11 Drawing Sheets

INTEGRATING THE INTERNET WITH THE PUBLIC SWITCHED TELEPHONE NETWORK

CROSS-REFERENCE TO RELATED APPLICATIONS

This is a continuation-in-part of U.S. application Ser. No. 10/176,476, filed Jun. 20, 2002, now U.S. Pat. No. 6,700,884 which claims the benefit of Provisional application No. 60/301,757, filed Jun. 28, 2001.

BACKGROUND OF THE INVENTION

1. Field of the Invention

The present invention relates to the Internet and the Public Switched Telephone Network (PSTN); and more specifically to the integration of the Internet with the PSTN in such manner that systems, services, and devices on either can communicate with systems, services, and devices on the other, whereby the full benefit and unique characteristics of either network become available to these communications.

2. Description of the Prior Art

The Internet and the PSTN constitute discrete, independent networks from an architectural and operational perspective. Much is written about both networks, especially in terms of their architecture and operation. Consequently, the specification provided herein does not reconstruct that information other than providing general background information. The term "Internet" is commonly understood and used throughout the specification and claims in a conventional way. The Internet, in general, is an assemblage of interconnected routers that provide data transport services for server computers and user devices—typically PCs. The interconnection between routers is provided by private line data circuits, the main lines of which constitute the Internet "backbone". Internet Service Providers (ISPs) provide access to the Internet via dial up telephone lines with modems, and via dedicated arrangements such as T-1 circuits, cable modems on cable-TV systems, and DSL (Digital Subscriber Line) service.

The Internet is designed according to the Internet Protocol (IP), which provides detailed specifications for the construction, addressing, and routing of data packets (occasionally referred to as "messages" in this document). (The term "Internet Protocol" also is used loosely to refer to dozens of related protocols that are used in the Internet.) IP addresses are expressed as a series of digits separated by "dots" (periods), in the form XXX.XXX.XXX.XXX where XXX can be a number from 0 to 255. IP addresses provide a similar function on the Internet as telephone numbers provide on the PSTN. A communication with an Internet device can be established by sending a message addressed to the IP address of that device. Every device capable of communicating on the Internet has an IP address assigned to it, either permanently, or dynamically as needed. IP addresses in some environments are replaced with a proxy address; for purposes of this document, the term "IP address" shall refer to an actual IP address, or a proxy or other identifier translatable into an actual IP address. In some arrangements proxies or agents act on behalf of a client system and substitute the proxy's IP addresses for the addresses of the client devices—in these arrangements the combination of the proxy address and the original client system address resolve to provide a unique IP address for each client system. Internet data packets contain the IP address of both the sending system and receiving system (the source and destination, respectively). Since IP messages always contain the IP addresses of both the sending and destination device, when a device receives an Internet message from a sending device, it will then possess the IP address of the sender and can send messages in reply. The two devices can then engage in a communication across the Internet since each has the IP address of the other.

Routers have internal tables that provide routing instructions, which relate IP addresses to the available data circuits and access lines. A router functions by reading the destination address in a data packet, and then forwarding the data packet on one of its data circuits or access lines according to the rules of the routing tables. A data packet gets forwarded from one router to another, pinballing its way across the Internet until it reaches a router that is connected to the destination system.

The term "Public Switched Telephone Network", or PSTN, as used herein means the national and international telephone network, actuated when a user dials a telephone number associated with any other phone, causes it to ring, and if answered, is enabled to carry on a voice communication (or, more properly, a "voice grade" communication) with the person (or system) at the remote location. Just as the Internet is comprised of an aggregation of interconnected routers, the PSTN is comprised of an aggregation of interconnected local and long distance telephone switching systems. The local switching systems, referred to as telephone company (telco) central offices (CO), provide telephone subscriber services in a geographic area.

As used herein, the term "telephone central office switching system" refers generically to a class of systems, typically owned by the operating telephone company in any given area, which provide "local" telephony services to telephone subscribers in that area. Generally, the operating telephone company provides the "local loop" cabling and wiring from its central office to the physical location of each of its subscribers (a "telephone circuit", or a "line"). A telephone central office might house several switching systems of this class, each serving up to 100,000 subscribers or more. The central office represents the hub of a wheel having thousands of spokes, each spoke being a physical pair of wires providing telephone service to a subscriber in that area. Subscribers in any given area are provided service by the central office situated in the center of the area. Outside that area the wires home to other similarly situated central offices. The telephone company connects the telephone circuit of a subscriber to an access connection on the switching system, and assigns a telephone number to that circuit. In operation, the switching system (or just "switch") provides battery voltage on the phone line, sends dial tone to the subscriber line when the subscriber's phone goes off hook, receives the dialed digits, and then routes the call according to its internal instructions based on the called number.

Common manufactured switching systems of this class include the Lucent Technologies 5ESS, and the Nortel DMS100. All telephone central office-switching systems around the world are interconnected by "trunk" circuits that carry voice or voice grade telephone calls between systems, and most (if not all) such systems are also interconnected by a messaging network referred to as CCS/SS7 (Common Channel Signaling/Signaling System 7), or just SS7. Long distance calls to telephones outside of the area served by the local telephone company are typically routed to a long distance carrier, such as AT&T, MCI, or Sprint in the USA. The telephone central office switches connect via trunking and messaging circuits to a class of switching system referred to as a "toll switch", such as the Lucent Technologies 4ESS, operated by a long distance carrier. Toll switches normally do not provide local telephone services.

In the current state of the art there are two inter-related messaging systems utilized within the PSTN. These are: (i) SS7; and (ii) ISDN (Integrated Services Digital Network), which incorporates a messaging system as an element of a broader product and service architecture. The SS7 messaging system extends through the major elements and systems of the PSTN, connecting virtually all of the local and long distance central offices, and carries call management (or call control) messages—also called signaling messages—relating to call setup and disconnection and similar call management functions. Whereas the SS7 messaging system is oriented toward providing messaging communications among and between the PSTN switching systems, the ISDN messaging system is oriented toward extending the PSTN messaging system to the end devices such as telephones and office telephone systems. Rather than going off hook and drawing dial tone from the local central office switching system to initiate a call, as analog phones do, an ISDN phone sends a packetized digital call setup message to the switching system to initiate a call. Both the ISDN messaging system and the SS7 messaging system are based on the X.25/X.75 communications protocols. ISDN messages are carried on the SS7 messaging network. Disadvantageously, neither the SS7 nor the ISDN messaging systems carry any messages related to creating an Internet communication by one device dialing the telephone number of another.

The ISDN and SS7 messaging systems are call setup and call management (or call control) systems which carry a spectrum of messages, message responses, message acknowledgements, and the like, such as are necessary to conduct telecommunications. A full listing of all the message types that might be employed in a robust telecommunications environment has not been attempted herein, since that depth of information is not necessary to convey the essential elements of this invention. A brief listing of those message types include: (i) call setup request messages which convey dialing and associated information; (ii) busy signal messages telling the calling device to deliver a busy signal to the user; (iii) audible ring back messages telling the calling device to deliver "pacifier" ringing to the user; (iv) call request acceptance or rejection messages (v) call connect messages; (vi) call disconnect messages; (vii) switchhook flash messages; (viii) call transfer request messages; (ix) call conference messages; (x) call waiting messages; (xi) Caller-ID and Call Waiting-ID messages; and (xii) call forwarding messages to redirect a call to another device. In addition to these messages, a variety of other messages would be employed to indicate information like "network busy", "invalid telephone number dialed", and the like.

Conventional communication vehicles comprise computers and telephones. Computers typically have telephone lines attached to them, and telephones oftentimes have computers attached to them; but there is no true integration that enables the blending of the Internet and the PSTN. The level of integration that is presently attained permits a computer to use a phone line to dial into the Internet. Once on the Internet, the computer can access another computer by entering its Internet Protocol (IP) address into application software such as a browser.

In an associated matter, there are now a variety of technologies that provide both Internet and PSTN connectivity. These technologies include: (i) Voice over IP (ii) DSL service; (iii) cable modem service delivered by cable-TV systems; (iv) fixed wireless systems; and (v) Internet capable cellular wireless systems.

In one aspect, the systems described herein relate to Voice over IP service. The term IP refers to the "Internet Protocol", the basic protocol of the Internet, while the term Voice over IP refers to sending digitized voice across the Internet using the IP protocol. Several companies provide discount rate phone calls using "Voice over IP" (VoIP) technology, wherein a long distance call of a client, typically a Personal Computer (PC) user, is carried over the Internet to a VoIP interface device in the vicinity of the called party. Such VoIP technology avoids the charges associated with placing a long distance call with a traditional long distance carrier. The VoIP interface device dials a local call on the PSTN to complete the connection for the VoIP client. Hence, the call travels partially over the Internet and partially over the PSTN as an analog call. A VoIP software application at the client device digitizes the user's voice and sends that as data messages across the Internet to the VoIP interface device. The VoIP interface device in turn converts the data messages to analog signals that are output onto the analog phone line. In the reverse direction, the VoIP interface device receives analog signals from the dialed phone and converts those analog signals to digital messages, which it sends across the Internet to the VoIP client. The VoIP software at the client converts those digital messages to analog signals, which are output to the user via speakers.

In another aspect, the systems described herein relate to an Internet access technology currently being deployed that is referred to as DSL (Digital Subscriber Line) service. (The original acronym was ADSL, for Asynchronous Digital Subscriber Line.) Although there are some variations on the technology (now generically referred to as "xDSL"), it essentially involves an analog telephone line supplemented by a high frequency carrier signal superimposed on the telephone line by a pair of modems—one at the subscriber location, and one at the telephone company central office. The DSL carrier signal can carry high-speed data concurrently over the same phone line without interfering with the analog phone service. Other than being carried by the same physical wires, the phone line has no relationship to the DSL Internet service.

In another instance, the matter to be discussed relates to virtual phone service provided via cable TV. Cable TV service has been used to provide high-speed Internet access—the popular "cable modem" service. In addition, there are a number of current activities related to delivering alternative provider telephone service via the cable TV distribution system. Similar to the Internet access service arrangement, the telephony service arrangement utilizes a "cable modem" to transmit and receive voice grade telephone calls. Other than being carried by the same physical cable, telephone service provided by cable TV has no relationship to the cable modem Internet service.

A related matter is that of virtual phone service provided by the so-called fixed wireless arrangement, currently undergoing field trials in some areas, and by the newly introduced cellular telephone service with Internet access. Although these are substantially different services from a user perspective, the wireless infrastructure is much the same.

In each of these technologies, even though they provide both Internet and PSTN connectivity, the Internet aspect is separated from the telephony aspect. Furthermore, none of these technologies enables one device to create an Internet communication with another device simply by dialing its telephone number.

Although they are discrete, independent networks, the Internet and the PSTN touch each other at the edges, in two fashions.

A.) Referring to FIG. 1, most computer users access the Internet 10 using a phone line 16, modem 17, and phone 18 connected to their Personal Computer (PC) 20 by dialing into a phone number provided by an Internet Service Provider (ISP). The phone lines 21 for these numbers are connected to devices called Terminal Servers 22, which incorporate compatible modems and concentrate the circuitry for multiple phone lines and modems. The Terminal Server has a high-speed digital connection 24 to the Internet, commonly in the form of a T-1 circuit, which is shared by all dial-in users (the concentrator function). The Terminal Servers are typically located in a telephone company central office 12, but owned by an ISP. The main component of the telephone company (telco) central office (C.O.) is a telephone switching system 14. The C.O.'s are connected together via communications links 26, and the aggregate of C.O.'s, switching systems, and interconnection links collectively constitutes the PSTN 28.

ISP's are in the business of providing Internet connectivity to subscribers of their service for a monthly fee or similar type of reimbursement (some ISP's use an advertising supported scheme, nevertheless, they are compensated for their service). Once a subscriber such as that shown as computer A dials in to and establishes a connection with ISP1 at the Terminal Server 22, a logical connection is created using the Internet protocols which allows the user to communicate with available systems on the Internet. Such a communication is initiated by the user sending a data message to the IP address of another system on the Internet.

B.) Several companies are in the business of providing discount rate phone calls using a technology called "Voice over IP" (VoIP), in which a long distance call is carried over the Internet to a drop off point in the vicinity of the called party. At the drop-off point there is a Terminal Server 22 type of device, working in reverse, such as that shown in FIG. 1 for Voice over IP carrier 1 (VoIP1). As before, this device has a high speed shared connection to the Internet 24, and has multiple local telephone lines 21 connected to it. Since the purpose of this device is to allow Internet users to make voice telephone calls, it would not normally have modems connected to the local telephone lines 21. Operationally, multiple, concurrent voice sessions are carried digitally over access connection 24 (multiplexed), and are distributed or demultiplexed to individual telephone lines 21. To distinguish this type of device from a standard Terminal Server, we will refer to it as a Voice over IP distribution device.

The Voice over IP carrier provides each of its users with a software application (not shown) that enables the computer user to enter a number to be dialed. The computer user A, having created an Internet connection as described previously, dials a phone number by using the VoIP software application. That software application, perhaps operating in conjunction with other systems of the VoIP carrier, creates a logical connection across the Internet to a remote VoIP distribution device such as that labeled VoIP1. Upon receiving a request from a user to create a telephone connection, the VoIP distribution device takes a local phone line 21 off hook and dials the number input by user A. When the remote party answers, perhaps someone at the phone labeled B, a voice connection (or "voice grade" connection) is established. The business proposition for VoIP is that ISP's charge either a flat rate or an hourly rate for usage, but once a user's data gets on the Internet, it can go anywhere in the world for no additional fee. The ISP's fee is small compared to the per-minute charges of telephone companies, and there is no charge equivalent to the telephone companies' long distance charge. Since the long distance component is free, and the monthly ISP subscription fee has already been paid by the subscriber, the VoIP carrier only has to bill enough to recover the costs of providing the VoIP distribution devices and local phone lines.

What is not provided by either of these two arrangements is a mechanism by which a user either on or off the Internet can dial a phone number and, if the device associated with that phone number has Internet connectivity, communicate with that device via the Internet. If such an arrangement were possible, then those two devices could communicate with all the richness that the Internet has become known for, by simply by dialing a phone call. Because of the voids in current technology, there remains a need in the art for a method and means to integrate the Internet with the PSTN.

SUMMARY OF THE INVENTION

The present invention provides a method and means for integrating the Internet with the PSTN such that an Internet communication can be created by one device calling the telephone number of another. In accordance with the invention, devices for integrating the Internet with the PSTN ("Integrated Devices") have an Internet connection with an associated IP address, which is either permanently or dynamically assigned, and have a telephone connection with an associated telephone number. The telephone connection to the PSTN could be a virtual telephone line, such as that being provided over cable-TV systems.

In order to conduct an Internet conversation between two devices, each device must have an IP address. This invention provides for a means to obtain the IP address of at least one of the calling and called devices and to provide that IP address to the other, such that one of the two devices can initiate a communication to the other over the Internet. The Internet Protocol incorporates the IP address of the sender and the receiver in every message. When one device initiates an Internet communication to the other, the receiver automatically learns the IP address of the sender and a two-way communication can commence.

There are a variety of ways to obtain the IP address of a calling or called device. In each such arrangement, there are provided telephone number cross-references, which contain the IP address associated with the telephone number of an Integrated Device. In simple terms, Internet devices or telephone devices wishing to communicate with an Integrated Device known by a telephone number can determine if that telephone number has an IP address associated with it by looking it up in a cross-reference, or by having an agent such as a telephone central office perform that lookup. Cross-references of IP addresses to telephone numbers could be maintained in the Internet, in the PSTN, in the device, or in any combination of the three.

Once an IP address has been obtained for a calling or called device it must be delivered to the other device. This invention also provides a means for delivering the IP address of one device to the other. In general terms, this requires an addressable digital messaging arrangement such that digital messages can be sent to one or the other of the two devices. The Internet, of course, satisfies this requirement and is suitable in some scenarios, such as that illustrated in FIGS. 2, 3, and 5. However, there also are other available technologies suitable for sending addressable digital messages in a telecommunications environment, such as the messaging component of ISDN service (Integrated Services Digital Network). This aspect of the invention inherently requires that the sender know the digital address of the device to which the message will be sent. In some scenarios, that address will be an IP address, perhaps discovered from a cross-reference. In other scenarios, such as an ISDN environment, that address is automatically tied to the telephone number, so one device only needs to know the telephone number of the other to send it an ISDN message. In yet other scenarios, the telco switching system will know that address from subscriber records.

The Internet already maintains a cross-reference system, referred to as the Domain Name Service (DNS), which allows an Internet "site" or "location" to be publicly known by an alphanumeric name, such as Sears.com or Toyota.com, rather than by the strictly numerical IP address. (A master registry is maintained by the InterNIC organization, and is copied daily to thousands of DNS servers around the world.) This DNS service could be expanded to also maintain telephone numbers for these Internet locations. In addition, the cross-reference of IP addresses to telephone numbers could be indirect via the use of names by looking up a telephone number (TN) to find a name, then looking up the name to find the IP address. In the more straightforward version of this arrangement, if an Internet device wished to communicate via the Internet to a device known by a telephone number, it could query an appropriate DNS server for the telephone number. If the called device is listed in the DNS server as having an IP address, the calling device will receive that information back from the query. The calling device may then communicate with the called device via the Internet.

In another cross-reference version, the Integrated Devices themselves could provide the cross-reference of telephone number to IP address by a device knowing its own TN and IP numbers. The calling and called devices could exchange this information using available techniques such as the messaging system incorporated into ISDN.

The PSTN could also maintain a cross-reference of telephone numbers having associated IP addresses. Thus, if a device, having an IP address, called a second device, also having an IP address, and the PSTN maintained a cross-reference of these numbers, then the PSTN could notify the caller of the called device's IP address via some appropriate means (or optionally, notify the called device of the caller's IP address, or notify each of the other's IP address). The caller could then communicate directly with the called device via the Internet.

In the discussions of the PSTN, it should be understood that the PSTN is no more a monolithic whole than is the Internet. It is comprised of very many telephone companies and authorities, and each might have very many switching centers (telephone company Central Offices). Therefore, in an arrangement in which "the PSTN" maintains a cross-reference between phone numbers and IP addresses, it would be reasonably understood that an authority, company, regional district, or Central Office might maintain such a cross-reference for local subscribers, and depend on other authorities, companies, regional districts, or Central Offices to maintain the same information for their own local subscribers.

In another arrangement of the current invention, the PSTN dynamically assigns IP addresses to communications devices on a temporary basis as needed for the establishment of an Internet communication. In a variation of this arrangement, the PSTN provides a proxy service for the communications device by translating the device's own IP address to a dynamically assigned IP address for the establishment of an Internet communication. In these arrangements, the PSTN assigns an IP address to one or the other or both of the calling and called devices, and provides at least one of the devices the IP address of the other, such that one of the two devices can initiate a communication to the other over the Internet using the temporary IP addresses. The temporary IP address assignment is disassociated from the device upon termination of the Internet communication. Since the PSTN dynamically establishes the IP address as needed, maintenance of a cross-reference is unnecessary.

Dynamically assigned and proxied IP addresses provide privacy and security to the resulting Internet communications. In the conventional telephony environment, telephone carriers provide rigorous controls to ensure that the privacy of non-published telephone numbers is protected. The SS7 signaling system comprises a closed and secure network having negligible risk of snooping. The only way that a called party can learn of the caller's telephone number is by Caller-ID, and the PSTN suppresses that information for calls from non-published telephone numbers. Therefore, non-published telephone numbers are well protected within the PSTN as it currently exists. However, the Internet is open and inherently insecure, and is susceptible to snooping and many other forms of undesirable and malicious activities. Consequently, the IP addresses of both the calling and called parties are susceptible to exposure, and data that is transmitted between devices using known IP addresses is susceptible to eavesdropping. Furthermore, since both the calling and called devices on an Internet communication will possess the IP address of the other, a simple packet-reader software application can provide the remote party's IP address to the user. Since an IP address on the Internet is equivalent to a telephone number on the PSTN, a user obtaining the IP address of the other party is equivalent to a called party obtaining the telephone number of a caller. Anonymity and privacy are lost.

Dynamically assigned and proxied IP addresses are only associated with an individual communications device for an ephemeral period such as the duration of a single communications session, and therefore the discovery of such an IP address by another party does not expose the temporary holder of that IP address to future undesired calls. Thus, dynamically assigned and proxied IP addresses provide a mechanism for offering non-published communications services across the Internet.

However, even proxied IP addresses may provide an undesirable amount of information to a malicious recipient. For example, a called party with a packet reader software application could discover the temporary IP address of the caller and, while the Internet call is active, use a trace route software application to discover the approximate origin of the call. In some circumstances, a subscriber of a non-published telephone number (perhaps a battered spouse in hiding) may wish their location information to be private as well, and may presume that to be the case. Trace route applications query each router in the path between source and destination; most routers identify themselves with owner and network information including city and state location. Therefore, even if the proxy servers did not reveal their own locations, a malicious user may be able to determine the calling party's approximate location using this technique.

The current invention provides an arrangement to disguise the caller's location and thwart attempts at its discovery. This arrangement retransmits Internet data through an intermediate proxy server. An intermediate proxy server may be randomly chosen for each Internet call from the available proxy servers. Without an intermediate proxy server, the IP address of the caller, as seen by the called device, is actually an IP address owned by the proxy server of the caller. In the arrangement with an intermediate proxy server, the IP address as seen by the called device is actually an IP address owned by the selected proxy server which may be physically located in a disperse geographic area. Therefore, a trace route would show a location of origin that is different from the actual location of origin, and which might vary for every call by an individual device; it would never show the location of the caller's device, the caller's proxy server, or nearby routers. In an optional variation of this arrangement, a telco could establish a centralized location for these intermediate proxy servers, and thus all Internet calls would show this location as the location of origin.

In a practical implementation, Internet data of both the calling and called devices travels through the intermediate proxy server. Communications conducted in this fashion will be extraordinarily difficult, if not impossible, to eavesdrop upon.

A further level of privacy and security of Internet communications can be obtained by encrypting the communications data that is transmitted across the Internet. There are two basic encryption methodologies, referred to as secret key and public key. Keys are very long numbers used to mathematically encode and decode information.

Public key encryption actually uses two keys for each user wishing to encrypt and decode information: one key being the "public" key that can be shared publicly and may even be published in a repository, and a private key that only the user knows. The public key is provided to those who wish to send encrypted information to the user. The public key can encrypt the information, but cannot decrypt it. Only the private key can decrypt it. Thus, your public key can be commonly known, and others may use it to encode information that only you can decode with your private key. Due to its nature, a public key may be transmitted across the Internet without risk. Public key encryption is used on the Internet (by e-commerce web sites, for example) in a complex process in which the web site obtains a "certificate" from an authorizing agency. The certificate contains the web site's public key, and the authorizing agency assures others that the certificate is, in fact, owned by the web site as they claim.

Secret key encryption uses a single key to both encode and decode, and thus, anyone who obtains the secret key has the capability of decoding privileged information. Obviously, then, precautions must be taken in providing others with a secret key lest it fall into the wrong hands. Sending a secret key between calling and called parties on the Internet would present the risk that an eavesdropper could obtain the secret key and surreptitiously decode the conversation.

For purposes of encrypting voice and multimedia communications on the Internet, public key encryption offers the advantage of being able to send the public key to others across the Internet without compromising the security of the communication. However, public key encryption is computationally intensive, typically running hundreds to thousands of times slower than secret key encryption, and is generally unsuitable for encrypting and decrypting real time communications. The computational requirements of secret key encryption are modest and well within the capabilities of current art for encoding and decoding real time communications. It would be possible, although unnecessarily awkward, to use an encryption "envelope", meaning the concurrent application of multiple encryption technologies to an individual document or communication. Because of the computational requirements of public key technology, there are Internet arrangements in which a document is encrypted with a secret key for fast encoding and decoding, and then the secret key itself is encrypted with the public key. The "envelope" containing both encodings is then transmitted on the Internet to the owner of the public key. That owner may then decode the secret key, and then use the secret key to decode the document. In order to apply this envelope concept to telephony-style communications on the Internet, all users would be required to possess a public key/private key and either possess or have the ability to generate a secret key. At the establishment of a call, one (the caller, perhaps) would then be required to send an encoded secret key to the other, along with their public key. Both parties would then encode and decode the ensuing communication using the secret key.

However, rather than having either of the parties to a communication establish the encryption key, there is an inherent security advantage of having a neutral and trusted entity such as a telco create and assign the key. In addition to this security advantage, there is a companion advantage of imposing lesser demands on the requirements for user devices.

Of the available options, the most simple and straightforward is for the telco (the PSTN) to assign a secret key to the call, and deliver that secret key to the calling and called devices as part of the call establishment process. Both calling and called devices then use the same key to encode and decode the communication. Therefore, in a fashion similar to the previously defined arrangement of providing dynamically assigned IP addresses to calling and called devices and proxy servers via the private messaging capabilities of the PSTN (i.e., SS7 and ISDN), this invention also specifies the use of those same messaging capabilities to deliver a secret key to the members of an Internet communication, wherein the establishment of the Internet communication is managed by the PSTN. The key is used to encode and decode voice or other aspects of a call wherein some or all of the associated communications transpire over the Internet. In arrangements wherein some aspects of a communication transpire over the Internet and some (voice, for instance) over the PSTN, either the Internet aspects or the PSTN aspects or both may be encrypted. The key may optionally be created or assigned by any of the devices in a communication, including calling and called devices and proxy servers, or by any element of the PSTN such as a central office switching system. Since a new secret key will be assigned to every call, the possession of a key from a prior communication is meaningless.

Although the preceding argues the benefits of secret key encryption, the same methodology could be applied to delivering any workable combination of encryption keys to communicating devices. Thus, the PSTN could assign and deliver a public key, a private key, both public and private keys, a secret key, an "envelope" comprising a public key encoded secret key, and so on. For example, in an unconventional application of public key technology, the PSTN could assign and deliver a public key/private key set to each of the calling and called devices, enabling each device to encode and decode their communications with the provided keys. Furthermore, each direction of communication could be provided with a different key, such that communications from the calling device to the called device are encoded and decoded with one key, and communications in the reverse direction are encoded and decoded with another key (or key set).

This application specifies that the PSTN conducts digital messaging communications with the calling and called devices and proxy servers for the purposes described herein related to the establishment of an Internet communication. Those purposes include: direct a proxy server to assign an IP address; obtain an assigned IP address; notify the calling or called device of the remote device's IP address; notify a proxy server of a calling or called device's IP address; disassociate an IP address that was temporarily assigned to a calling or called device; deliver an encryption key to the calling and called devices; submit an IP/phone number query to the serving agency of the calling or called device possessing a telephone number to IP address cross-reference; and receive a query response and IP address from such a cross-reference.

There are several possible ways for the PSTN to conduct such communications. The worldwide PSTN SS7 messaging system interconnects all the major switching centers. It would be reasonable to anticipate that telephone companies might use SS7 for this purpose. As another possibility, the PSTN might use an existing messaging technology such as the messaging capability incorporated into ISDN, or ADSI (Analog Display Screen Interface, also referred to as Analog Display System Interface) for communicating these messages to end user devices. As still another possibility, the PSTN might have Internet access in order to communicate with the calling or called device or proxy server via an Internet message. The preferable arrangement is for the PSTN to use SS7 to communicate with PSTN systems, including proxy servers, and to use ISDN to communicate with end systems such as the calling and called devices. But, since multiple workable arrangements are possible, we only need to specify that the PSTN has a method of sending appropriate messages to one or the other or both of the calling and called devices and any proxy servers involved in a call.

In any of the above arrangements, the resulting "communication" between the devices could be entirely over the Internet (voice, screens, images, etc.), or part of the communication could transpire over the Internet (the screens and images, for example), and part could transpire over the PSTN (the voice communication, for example).

Using the inventions and arrangements outlined herein, a suitably equipped telephone user or Internet user wishing to communicate with a suitably equipped device known by its telephone number could create an Internet communication with that device. Moreover, an individual Integrated Device telephone could be reached either via the PSTN by dialing the phone number, or via the Internet by using an Internet addressing scheme. The phone number can be dialed from any phone or Integrated Device on the PSTN, or from any VoIP enabled device on the Internet.

BRIEF DESCRIPTION OF THE DRAWINGS

The invention will be more fully understood when reference is had to the following detailed description of the preferred embodiment of the invention and the accompanying drawings, in which.

DETAILED DESCRIPTION OF THE INVENTION

Figure 1:
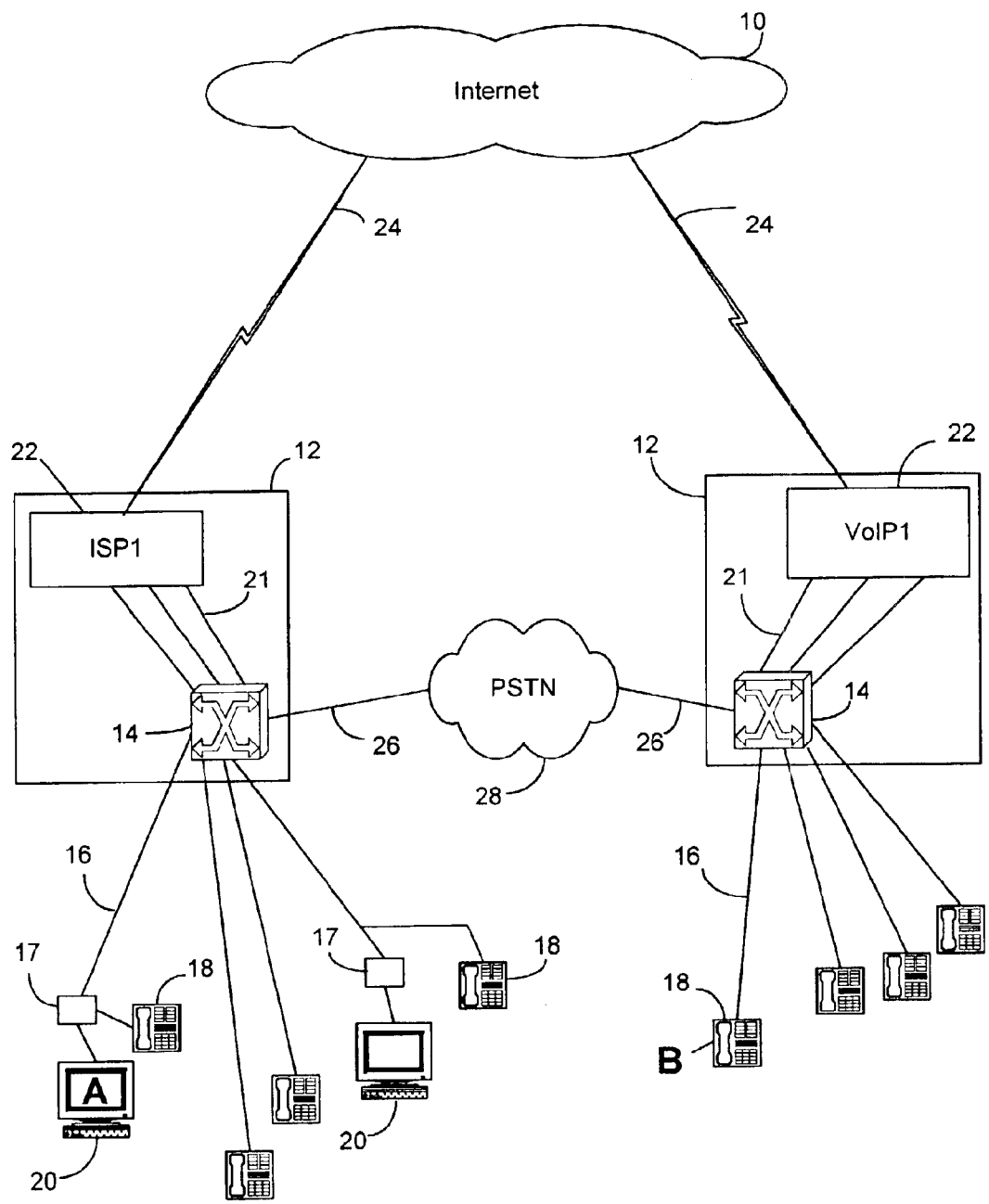
FIG. 1 is a schematic diagram of a Terminal Server providing access to the Internet for ISP subscribers, and providing VoIP Internet-to-PSTN telephone calls in the current state of the art.

Central to the principles and practice of this invention, as well as the inventions described by certain co-pending patent applications (described hereinafter), is the presence of means for enabling a calling device to create an Internet communication with another device simply by dialing its telephone number, thus integrating the Internet with the PSTN. The co-pending patent applications describe various aspects of this integration. One benefit of such integration is that traditional voice-only telephone calls can be augmented or replaced with multimedia communications using Internet protocols and capabilities. Such multimedia communications may include: voice and other audio; graphics, images and other visual material; motion video; and synchronized audio and video transmitted together including TV video and videophone service. The data for these multimedia communications may be transmitted on the Internet as a result of the integration described herein. The enhanced capabilities provided by the present invention facilitate that integration.

The following provides an overview of the co-pending patent applications.

Co-pending patent application entitled "Integrated Device For Integrating The Internet With The Public Switched Telephone Network", Ser. No. 10/176,466, describes "Integrated Devices", for integrating the Internet with the PSTN, which have an Internet connection with an associated IP address, a PSTN connection with an associated telephone number, and a digital messaging connection to the PSTN for conveying call management messages to include messages containing telephone numbers and IP addresses.

There exists a class of devices, such as those for Voice over IP, DSL, cable TV, fixed wireless, Internet capable wireless cellular, and similar distribution systems, which provide Internet and telephony services to client devices, such as phones and PCs, by providing an interface to the telephone company central office switching system. Copending application entitled "Telephone Central Office Switch Interface With Messaging Channel For Integrating The PSTN With The Internet", Ser. No. 10/177,792, discloses a method and means for providing specific messaging capabilities between a telephone central office switching system and this class of interface device, enabling the integration of the Internet with the PSTN. The communications link carries call setup, telephone number, and IP address messages to and from the switching system and to and from the client devices of the interface device.

Co-pending patent application entitled "Telephone Switching System For Integrating The Internet With The Public Switched Telephone Network", Ser. No. 10/195,227, discloses a method and means for a telephone central office switching system to enable a calling device to establish an Internet communication with a called device by dialing its telephone number.

Co-pending patent application entitled "Integrated Telephone Central Office Systems For Integrating The Internet With The Public Switched Telephone Network", Ser. No. 10/195,695, discloses an integrated assembly of telephone central office switching system integrated interface devices, comprising telephone central office switching systems, and switching system interface devices such as those for providing DSL service, Voice over IP (VoIP) service, cable modem service, fixed wireless service, and Internet capable cellular wireless service. The integrated telephone central office systems therein described offers efficiencies and economies further benefiting the integration of the Internet with the PSTN.

Co-pending patent application entitled "Call Management Messaging System For Integrating The Internet With The Public Switched Telephone Network", Ser. No. 10/195,241, discloses a messaging system for communicating call management messages among communications devices connected to the Internet and to the PSTN. Call management messages include call setup request messages, call acceptance messages, call rejection messages, Call Forwarding messages, and the like. The call management messaging system operates seamlessly across both the Internet and the PSTN, thus providing further integration of those two networks.

Co-pending patent application entitled "Interactive Device Control System For Integrating The Internet With The Public Switched Telephone Network", Ser. No. 10/228,748, discloses a system for the PSTN and the Internet in which a communications system offers the user of a device such as a screen phone the ability to control or influence functions of the communications system by presenting the user with a displayed menu of options. The menu of options is sent to the user's device by the communications system via a messaging system. Selection of an option by the user returns a response message to the communications system via the messaging system. Upon receipt of the response message, the communications system actuates the function associated with the user-selected option. The interactive device control system operates seamlessly across both the Internet and the PSTN, thus providing further integration of those two networks.

Co-pending patent application entitled "Stored Profile System For Storing And Exchanging User And System Communications Profiles To Integrate The Internet With The Public Switched Telephone Network", Ser. No. 10/228,723, discloses a system for the PSTN and the Internet to maintain and exchange communications related information such as personal contact information and preferences. The Stored Profile System enables users to exchange contact information such as Electronic Business Cards as a part of call setup, operating like an enhanced Caller-ID, and enables the calling party to select from available options offered by the called party's system for communicating with the called party. The stored profiles capability extends to communications systems on both the PSTN and the Internet, thus further promoting the integration of the Internet with the PSTN.

Central to the principles and practice of this invention, as well as the inventions described by the co-pending patent applications, is the presence of means for enabling a calling device to create an Internet communication with another device simply by dialing its telephone number, thus integrating the Internet with the PSTN. The co-pending applications describe an environment in which the various elements of the PSTN are enabled to conduct digital, packetized messages, which communicate essential information between various devices across the Internet and the PSTN to provide for this integration. Although not limited to the scope of the following listing, these enabled PSTN elements include: (i) the end or terminal devices such as telephones, wireless handsets, and Integrated Devices; (ii) telephone central office switching system interface devices, such as those for VoIP, DSL, cable-TV, fixed wireless and cellular wireless, and the like, which provide telephony and Internet services for client devices; (iii) telephone central office switching systems which provide telephony services for client devices; (iv) telephone long distance switching systems which provide long distance capabilities on the PSTN; (v) office telephone systems such as PBXs, Key Systems and the like; and, (vi) adjunct devices such as automated attendant systems, automatic call distributors, voice mail systems, and the like.

Some of these devices, including the end or terminal devices, are uniquely addressable within the messaging system via an IP address, telephone number, or other identifier associated with the device. Other identifiers could include an internal system reference (e.g., module, cabinet, shelf, slot, port number), an ISDN (Integrated Services Digital Network) address, or the like. Regardless of the nature of the address, Integrated Devices have messaging addresses known to the serving system such as a telephone central office switching system, telephone central office switching system interface device, office telephone system, and the like, such that the serving system can communicate with the Integrated Devices via the messaging system.

The messaging system common to this invention and the inventions of the co-pending patent applications connects between each of these devices and systems, and the messages of which the messaging system is comprised are transmitted to and between each of these devices as are necessary for any individual communication. Some devices and systems may simply act as a pass-through for the message stream by passively or actively forwarding messages, or may act as a pass-through for specific message types while acting upon others. Each device or system may send, receive, forward, or act upon any given message as is necessary to accomplish the message functions. Messages may be sent in one or more pieces from one device to the next, and devices may assemble, reformat, repacketize, augment a message with additional data, or otherwise manipulate a message as is processed through the system.

The co-pending applications described hereinabove provide reference information useful in developing a full understanding of the present invention as it relates to these systems and devices. Accordingly, the disclosure of each aforementioned co-pending application is incorporated herein by specific reference thereto.

Certain enhancements over the co-pending patent applications are herein described.

This invention provides for the capability of DNS servers to maintain a cross-reference of TN to IP for Integrated Devices, and for a device wishing to establish an Internet communication to an Integrated Device being able to query the DNS cross-reference by the telephone number of the Integrated Device to retrieve its IP address. Once having the IP address, the initiating device, which also can be an Integrated Device, can send an appropriate message to the Integrated Device to establish an Internet communication between them.

Figure 2:
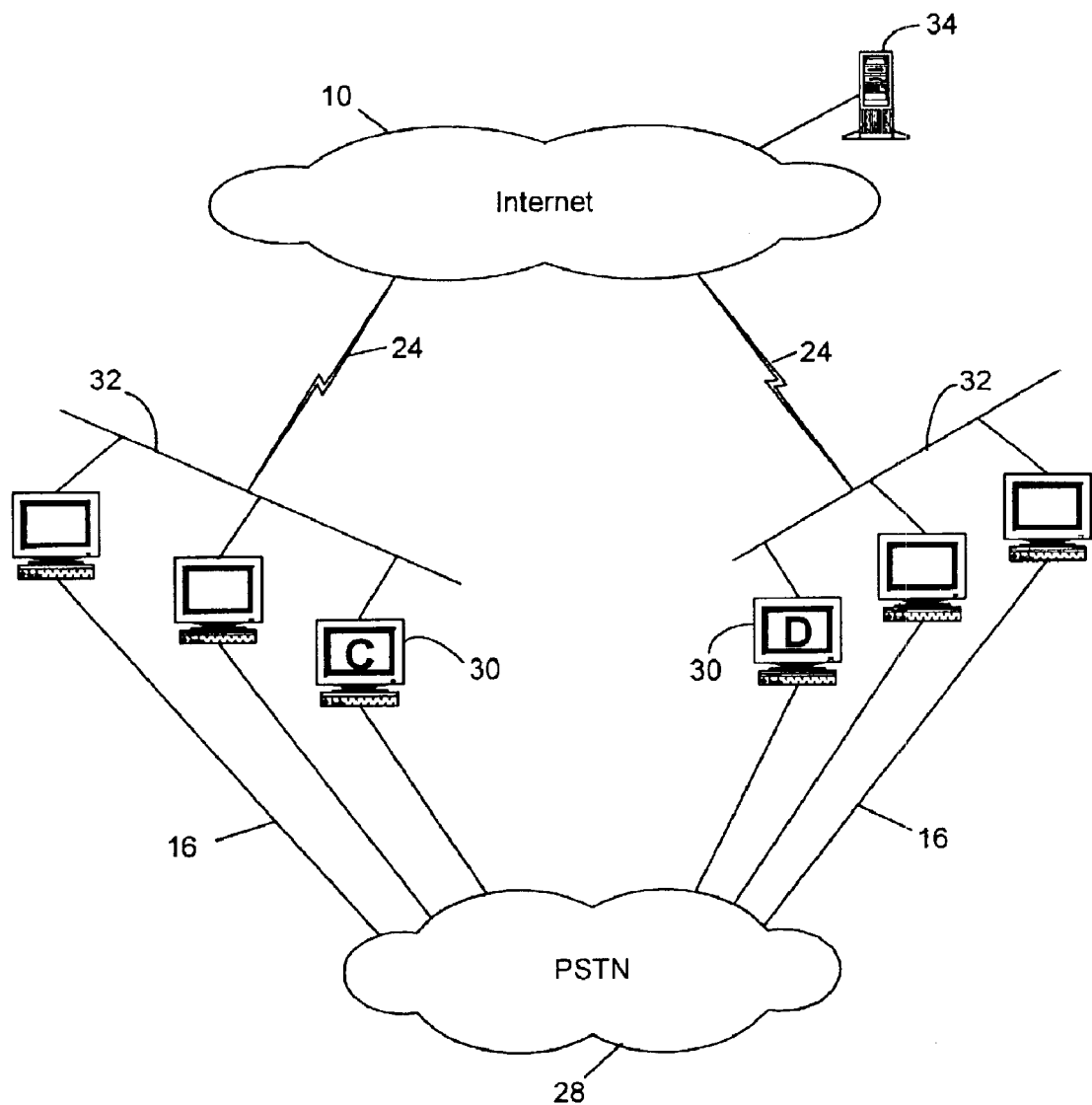
FIG. 2 is a schematic diagram of Integrated Devices on the Internet and the PSTN, showing a DNS method of maintaining a cross-reference of TN to IP.

FIG. 2 shows the Internet 10, the PSTN 28, a series of Integrated Device workstations 30, one of which is labeled C and one labeled D, connected to phone lines 16 and to Local Area Networks (LANs) 32. The LANs have access lines 24 connecting to the Internet. Shown throughout these drawings, access lines 24 represent a suitable connection to the Internet such as that provided by a T-1 circuit. Similarly, other components such as phone lines 16 and LANs 32 are intended to represent a generic class of objects. The Internet has a DNS server 34. The DNS server, which normally maintains a cross-reference of Internet names to IP addresses, is also provided with a cross-reference to telephone numbers for Integrated Devices.

A description of the manner wherein this arrangement functions operationally is set forth hereinafter with reference to the following example. Assume that the Integrated Device workstation labeled C wishes to call the Integrated Device workstation labeled D. Also assume that workstation C has a telephone software application that can dial phone calls on the associated telephone line 16, and that can also create an Internet communication to a called Integrated Device. The user at C enters the telephone number (TN) for D into the telephone software application of workstation 30 in an appropriate fashion (perhaps by typing the numbers on a computer keyboard). The telephone application will determine if the called TN is associated with an Integrated Device and is therefore available to create an Internet communication; it will make this determination by performing a DNS query on the dialed TN of workstation D to ascertain whether or not workstation D has an IP address associated with its telephone number. Assume that the workstation C has encoded into it the Internet address of the DNS server 34, as is customary. Workstation C creates a DNS query message containing the TN of D and sends it by appropriate addressing to the DNS server 34. Assume for this example that workstation D is an Integrated Device, therefore possessing an IP address associated with its telephone number. The DNS server 34 looks up the TN in the cross-reference, finds the associated IP address of D, and sends a response message to C containing the IP address for D. The telephone software application of workstation C then creates and sends an Internet message to D, addressed to D's IP address, requesting an Internet connection. If workstation D responds favorably, an Internet communication commences. If, on the other hand, called workstation D were not an Integrated Device, and therefore not possessing an IP address associated with its telephone number, DNS server 34 would return a negative response to the query message from workstation C. The telephone software application of workstation C would then seize the associated telephone line 16 and dial a standard telephone call to workstation D.

Enhancing the operation just described, the DNS server could be arranged to facilitate the integration of the Internet and the PSTN such that, by receiving an appropriate DNS query message from Workstation C containing the TN of Workstation D, the DNS server obtains the IP address of Workstation D. Now having the IP addresses of C and D, the DNS server then sends an appropriate message to Workstation D informing Workstation D of the query by C and C's IP address. Workstation D then creates and sends an Internet message to C, addressed to C's IP address, thus completing an Internet connection between the two devices.

Figure 3:
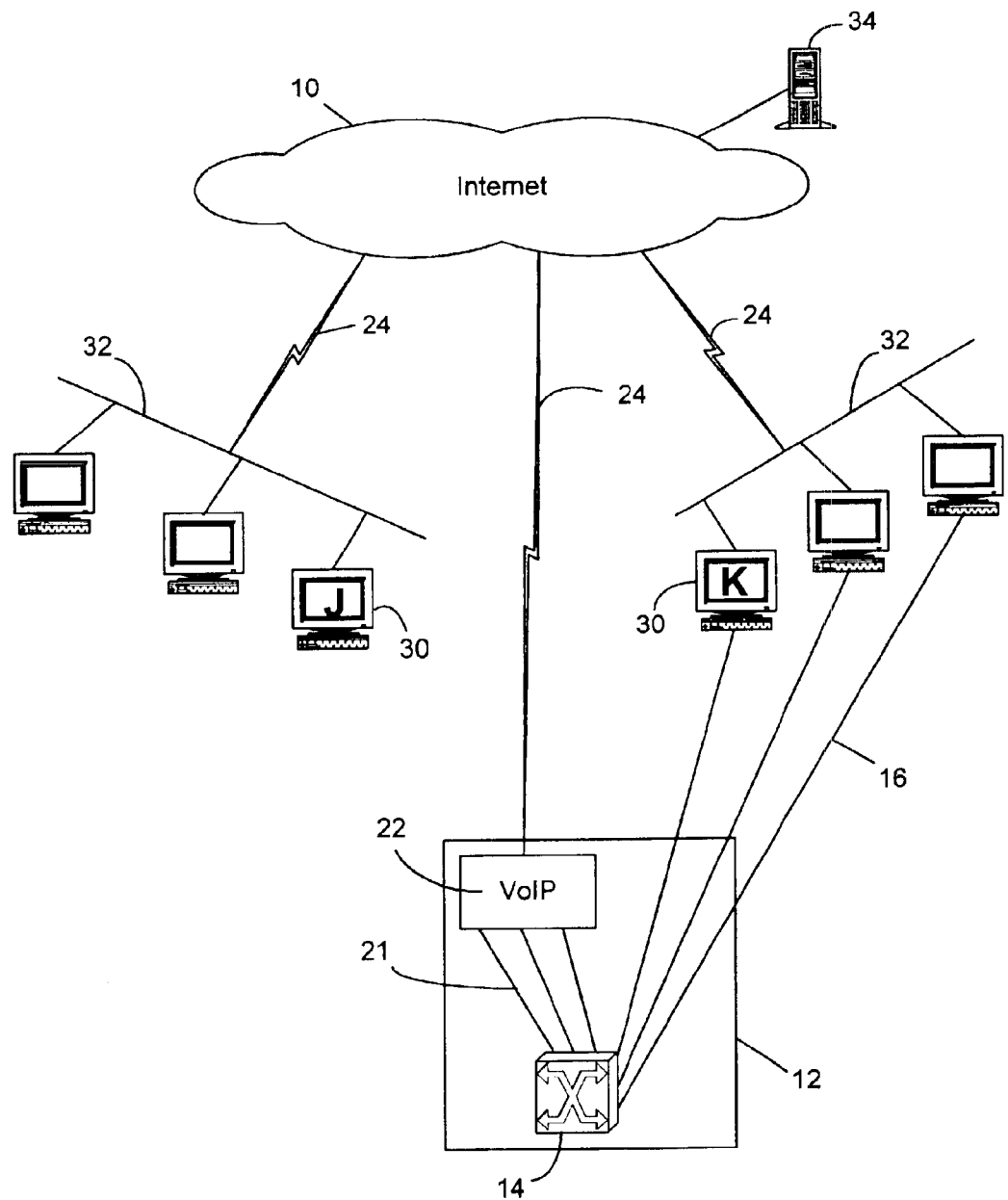
FIG. 3 is a schematic diagram showing a DNS cross-reference in a VoIP environment.

FIG. 3 illustrates a variation of the DNS server cross-reference arrangement in a VoIP environment in which the calling device has Internet connectivity but has neither PSTN connectivity nor a telephone number. Referring now to FIG. 3, there is an arrangement with workstations 30 on the left side of the drawing, one being labeled J, residing on a LAN 32 having access line 24 to the Internet, and a similar arrangement on the right side of the drawing with workstations 30, one being labeled K, having telephone lines 16, these workstations residing on another LAN 32 which also has access line 24 to the Internet. As in FIG. 2, the Internet is shown as 10 and a DNS server as 34. Telephone central office 12 includes switching system 14 which provides telephone lines 16 and also provides telephone lines 21 to VoIP interface device 22. VoIP interface device 22 has access line 24 to the Internet.

To describe the operation of this arrangement, assume that workstation J, having only an Internet connection, wishes to place a VoIP telephone call to workstation K. In the prior art method of operation, the user of J would enter the telephone number of K into a VoIP software application. That application, working in conjunction with the facilities of the VoIP vendor, sends a call setup request message, containing the called TN, via the Internet to VoIP interface device 22. VoIP interface device 22 would then seize a telephone line 21 and dial the telephone number of workstation K. If K answers the call, an end-to-end connection, extending partly over the Internet and partly over the PSTN, is maintained by VoIP 22.

In the method of operation of this invention, when VoIP interface device 22 receives the call setup request message from J it sends a DNS query message containing the called TN to DNS server 34. Assume for this example that workstation K is an Integrated Device, therefore possessing an IP address associated with its telephone number. The DNS server 34 looks up the TN in the cross-reference, finds the associated IP address of K, and sends a response message to VoIP interface device 22 containing the IP address for K. VoIP interface device 22 sends a message containing the IP address of K to calling workstation J notifying J that an Internet communication can be created with K. The telephone software application of workstation J then creates and sends an Internet message to K, addressed to K's IP address, requesting an Internet connection. If workstation K responds favorably, an Internet communication commences. If, on the other hand, called workstation K were not an Integrated Device, and therefore not possessing an IP address associated with its telephone number, DNS server 34 would return a negative response to the query message from VoIP interface device 22. VoIP interface device 22 would then process the call in the prior art method of operation by seizing a telephone line 21 and dialing a standard telephone call to workstation K.

Another variation in which the DNS server maintains a cross-reference of TN to IP address enables an Internet device to create a telephone call to a device known by its IP address or name. As an example of this variation, assume that Workstation D of FIG. 2 is the web site for PC Connection, a catalog company selling computer products. PC Connection sells products over the Internet, by mail order, and by telephone order. Assume that Workstation C has a VoIP application that can accept the input of either TN's or names. If the user at Workstation C wishes to call PC Connection, they may enter the PC Connection web site address into the VoIP application. The application queries a DNS server to obtain the TN of PC Connection. The application then causes the workstation to originate a telephone call to PC Connection's TN.

Figure 4:
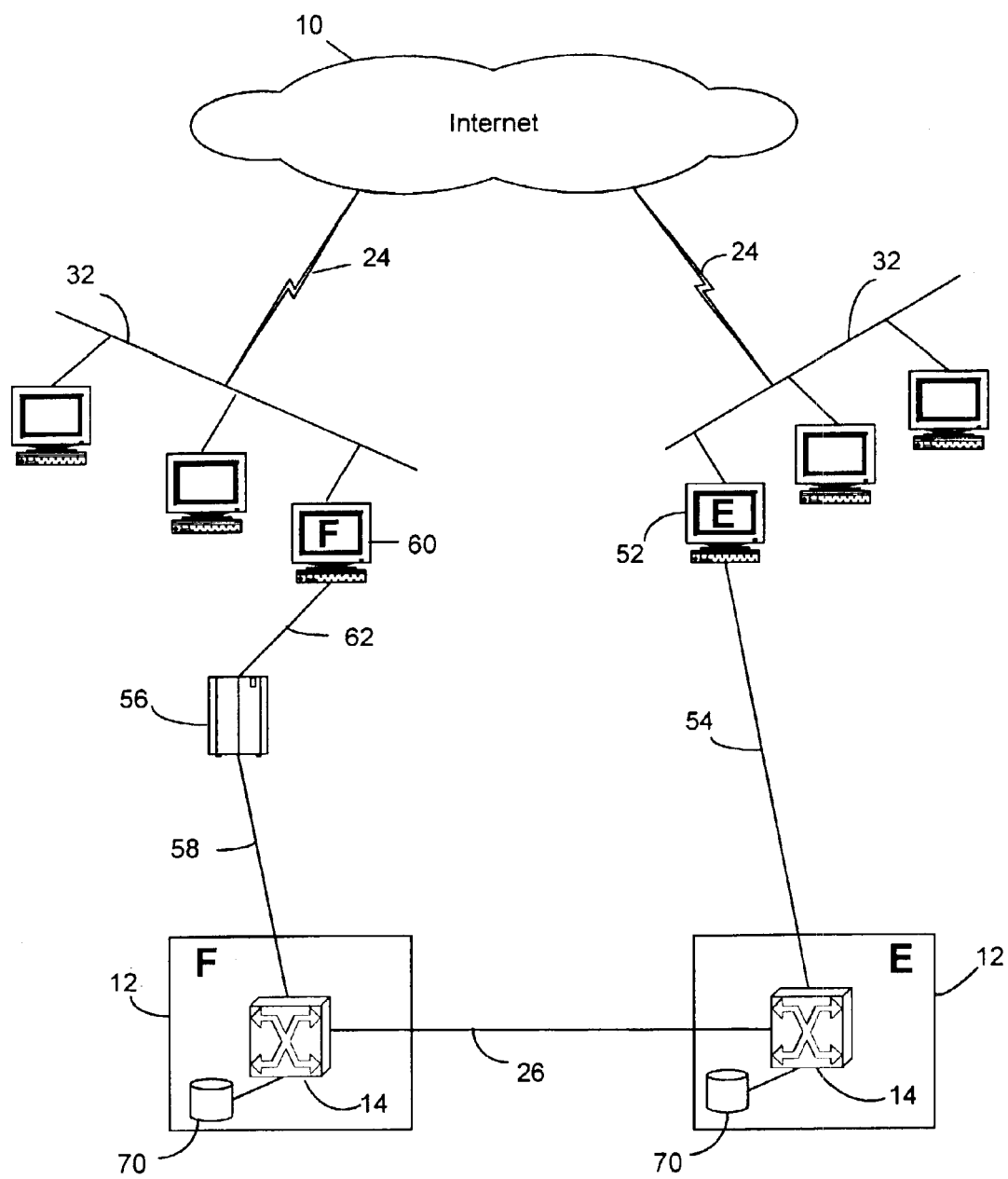
FIG. 4 is a schematic diagram illustrating an Integrated Device that maintains its own cross-reference of TN to IP and provides the IP address to the called Integrated Device.

In another embodiment, the Integrated Devices maintain their own cross-reference information and provide that cross-reference information to another Integrated Device via the PSTN in such a fashion as to enable an Internet communication between the two devices by one dialing the TN of the other. Referring now to FIG. 4, the Internet is shown as 10, and the PSTN is shown by two of its component C.O.'s 12, telephone switching systems 14, and interconnecting circuits 26 between them. Integrated Device workstation E shown as 52 is connected to a C.O. switch 14 by an ISDN BRI (Basic Rate Interface) connection 54. Integrated Device workstation E maintains its own TN to IP cross-reference (not shown). Workstation E is also connected on a LAN 32 having an access line 24 to the Internet. ISDN PBX (Private Branch Exchange) 56 is connected to a C.O. switch 14 by an ISDN PRI (Primary Rate Interface) circuit 58, and has an Integrated Device workstation F shown as 60 connected to it via an ISDN BRI connection 62. Integrated Device workstation F maintains its own TN to IP cross-reference (not shown). Workstation F is also connected to a LAN 32 having an access line 24 to the Internet. ISDN is a message oriented digital service comprised of both the capability of sending digital messages between devices and systems, and a suite of protocols to convey a structured set of information. For example, instead of sending tones for dialed digits to the C.O., an ISDN device sends a call setup request message to the C.O. containing the desired TN. If the call extends to another C.O., the local C.O. forwards the call setup message on to the remote C.O., and so on. Similarly, messages can extend through a PBX to its extension phones (in our case, an Integrated Device workstation). One aspect of the ISDN messaging system is the ability to send messages between end devices on a call.

By way of example to demonstrate the operation of this arrangement, presume that Integrated Device workstation F places a call to Integrated Device workstation E. Workstation F sends its IP address to E using an ISDN messaging capability. The ISDN messages travel across ISDN PRI access line 58, across the multiplexed communications link 26 between telco switching systems 14, and across the ISDN BRI link 54 to workstation E. Workstation E responds by sending an appropriate message via the Internet 10 to workstation F's IP address. Assuming that both devices agree to create the desired connection, an Internet connection is established and communication commences over the Internet. Optionally, workstation E could send its IP address to workstation F, with the remainder of the process working in reverse. A key point of this example is that the workstations function as elements of the PSTN in providing the IP address of one to the other via a PSTN digital messaging capability. Another point to highlight is that there could be surrogate systems, services, or devices that perform the cross-reference function as an agent or proxy on behalf of an individual device. For example, the ISDN PBX might maintain a cross-reference system for all of its Integrated Device workstations. Similarly, a server on a LAN might provide that service for all the Integrated Device workstations on a LAN.

Figure 5:
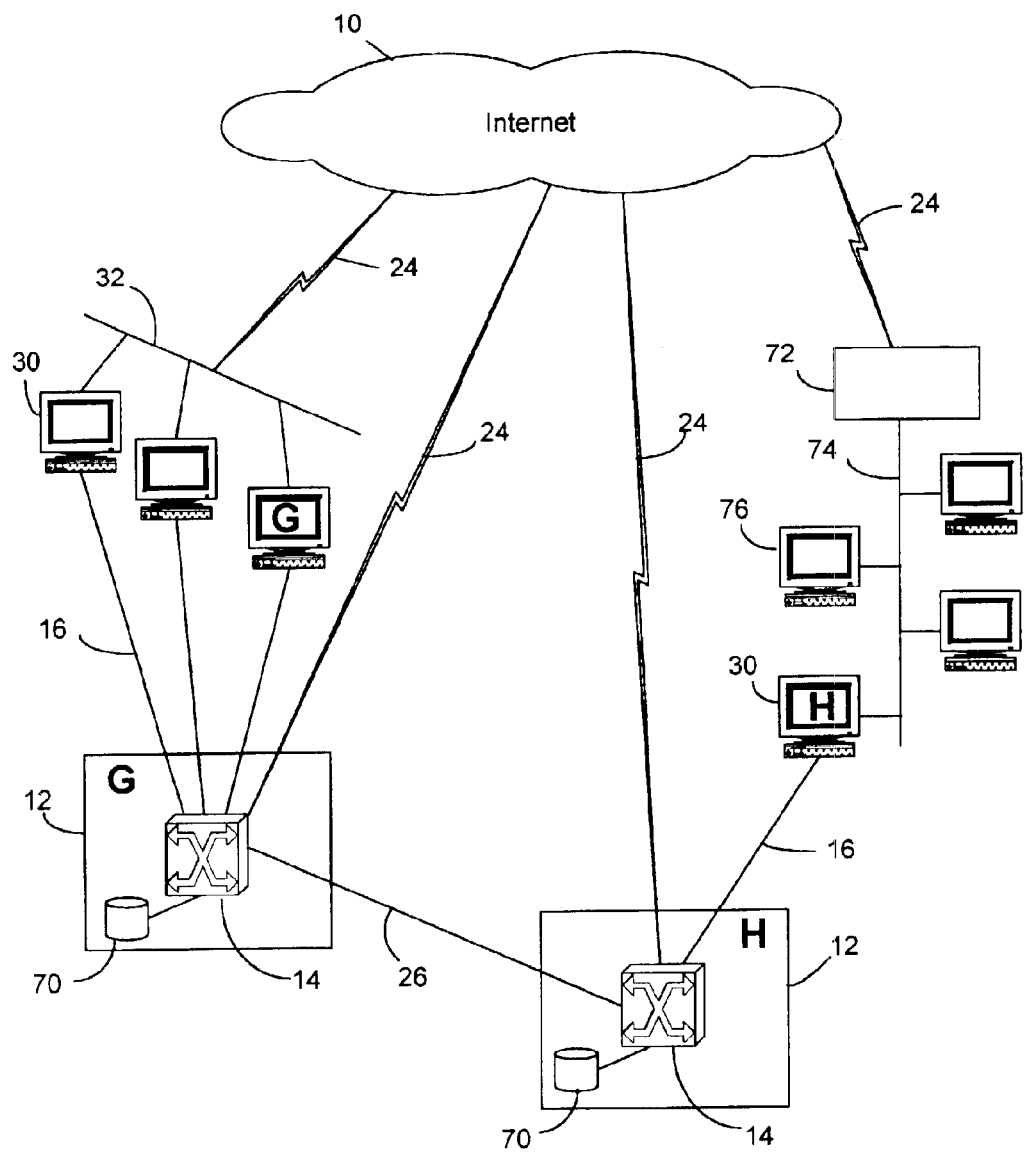
FIG. 5 is a schematic diagram depicting an embodiment in which the PSTN maintains the cross-reference of TN to IP and provides the IP address to the calling Integrated Device.

FIGS. 4 and 5 describe two variations of an embodiment of this invention in which telco central offices maintain the TN to IP cross-reference for their subscribers, exchange that information with other telco central offices in the process of call setup, and notify one or the other or both Integrated Devices of the IP address of the other in order to facilitate an Internet communication between them.

One variation in which the central office maintains the cross-reference can be described by again referring to FIG. 4 wherein the central office 12 and switching system 14 providing service to ISDN workstation E has associated with it database 70 containing a cross-reference of TNs to IP addresses for its client devices. In this variation, PSTN elements such as the serving C.O.'s communicate IP address information with calling and called devices via the ISDN messaging system. By way of example to demonstrate the operation of this arrangement, assume that Integrated Device workstation F places a call to Integrated Device workstation E. Workstation F sends a call setup request message via the ISDN messaging system to its serving central office 12, which forwards the call setup request message via multiplexed communications link 26 to the central office labeled E which serves workstation E. Central office E receives the call setup request message and looks up the IP address for workstation E in database 70 based on workstation E's telephone number. Central office E then, via the same messaging pathways, returns a message to workstation F containing the IP address of workstation E. Workstation F may then initiate an Internet communication with workstation E by sending an appropriate message to workstation E via the Internet. Optionally, central office F could look up the IP address for workstation F and forward the IP address along with the call setup request message to C.O. E, and then to workstation E via the ISDN messaging system. Workstation E then having the IP address of workstation F could initiate an Internet communication with workstation F.

FIG. 5 shows an environment in which the Integrated Devices have analog phone connections and in which the telephone central offices use the Internet as a messaging medium to communicate IP address information to those Integrated Devices. In FIG. 5, the Internet is shown as 10, and two telco C.O.'s are shown as 12, having telephone switching systems 14 with interconnecting circuit 26, thus comprising elements of the PSTN. C.O.'s 12 have cross-reference databases 70 which contain a cross-reference of TN to IP for each Integrated Device subscriber for which service is provided out of the respective C.O. The C.O.'s also have access lines 24 to the Internet for carrying IP traffic. Integrated Device workstations 30 including the workstation labeled G have analog telephone lines 16 connecting them to the C.O. LAN 32 has access line 24 to the Internet. Elements 72, 74, 76, and one Integrated Device workstation 30 comprise a cable TV distribution system used for providing Internet access (so called "cable modem" service). A cable TV distribution hub is shown as 72, the cable itself as 74, and various other devices connected to the cable as 76. Also connected to the cable is an Integrated Device workstation 30, labeled H, which also has an analog phone line 16 connecting it to its local telco C.O. switching system 14.

In operation, if Integrated Device workstation G dials the TN for Integrated Device workstation H, the C.O. labeled G sends a call setup request to the C.O. labeled H via a messaging channel, as is customary. The message will incorporate a message element requesting an Internet connection, and requesting the IP address of H. The C.O. labeled H will receive the message, look up in its cross-reference to find the IP address for H, and send that address by return message to C.O. labeled G. The C.O. labeled G now having the IP address of the dialed TN, and knowing the IP address of G by looking up G's TN in its own cross-reference, will send an Internet message to G via the C.O.'s Internet access line 24. The message will contain the IP address for H. Workstation G will then send an appropriate message to workstation H requesting an Internet connection. Assuming that both devices agree to create the desired connection, an Internet connection is established and communication commences over the Internet.

In an alternative method of operation, C.O. G looks up the IP address of calling Integrated Device G and incorporates that IP address in the call setup request message that is sent to C.O. H. Since C.O. H is receiving the IP address of the caller in the call setup request message, it can forward that IP address along with the telephone number of the caller to the called device H. The called device H, upon receiving the IP address of the caller can then initiate an Internet communication with the caller, as before. Optionally, C.O. H could look up the IP address of the called device H and send that to the calling device G via C.O. G. In this optional arrangement, both the calling and called devices would have the IP address of the other, and a protocol specification would determine which would initiate an Internet communication to the other.

It should be obvious from the prior discussions that a cross-reference of TNs to IP addresses could be maintained at any number of places such as in an Internet DNS system, in the PSTN at a telco central office, in the devices themselves, or in other associated systems. For example, in FIG. 5, cable-TV distribution hub 72 might maintain such a cross-reference for its client workstations such as workstation H. Furthermore, the concept of a cross-reference of an IP address to a telephone number generalizes to relating an IP address to a PSTN device. For example, as stated previously, a device might be known to its serving central office by an alternative identifier rather than by its telephone number; the central office might then obtain the IP address for the device from its service records based on the alternative identifier.

In a similar vein, these discussions have identified the fact that there are a variety of ways in which an IP address could be delivered such that a calling and called device could communicate over the Internet. These possibilities include the following: the IP address information could be delivered to either or both of the calling and called devices; it could be delivered from one device directly to the other; it could be delivered by an Internet service such as a DNS server; or, it could be delivered by telco C.O.'s via the Internet, or via an ISDN-style messaging channel. Other mechanisms may be possible which will accomplish the intended purpose.

Additionally, mixed modes of operation are possible as defined by this invention. For example, assume that an Integrated Internet/PSTN communication were to take place between Integrated Device workstation F 60 behind the ISDN PBX 56 of FIG. 4, and Integrated Device workstation H 30 on the cable TV arrangement of FIG. 5. The telco C.O. H providing service to workstation H may supply the cross-reference of TN to IP for workstation H, but ISDN PBX 56 or the workstation 60 itself may provide the cross-reference information for workstation 60.

Figure 6:
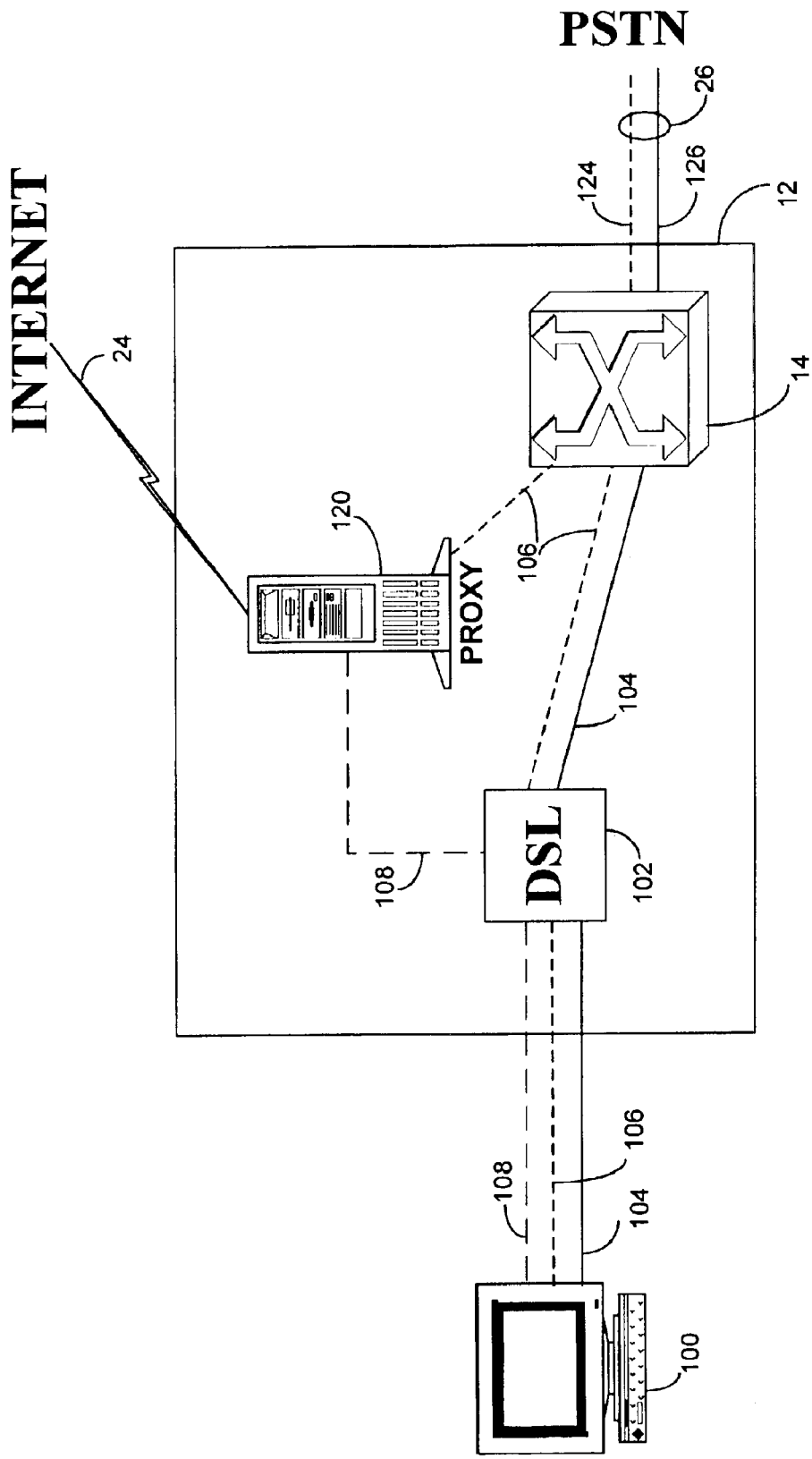
FIG. 6 is a schematic diagram that illustrates an arrangement in which the PSTN dynamically assigns IP addresses to user devices, enabling secure Internet communications, and also illustrates an arrangement in which the PSTN provides communicating devices with encryption keys, enabling secret communications.

FIG. 6 depicts an arrangement in which the PSTN assigns or proxies IP addresses for subscriber devices, being either the calling or called device in an Internet communication. Referring to FIG. 6, there is an Integrated Device 100, such as a user display phone, served by a DSL arrangement from telco C.O. 12 and switching system 14. The central office 12 and switching system 14 are interconnected to other equivalent PSTN systems via trunking circuits 126 and SS7 messaging circuits 124, which together comprise the multiplexed communications links 26. The DSL service is provided by a DSL modem 102 located in the C.O. 12, and by an equivalent DSL modem capability (not shown) incorporated into Integrated Device 100. The DSL system including DSL modem 102 conveys packetized Internet data 108 and voice-grade information 104. Optionally, the voice-grade information 104 may be packetized and transported via the DSL carrier-wave medium. The DSL system is enhanced over conventional designs to provide digital messaging arrangement 106 which offers connectivity and conveyance to digital messages between the switching system 14—or other appropriate PSTN elements such as SS7 systems—and Integrated Device 100, wherein the digital messaging of 106 comprises call setup, call management, and similar signaling messages such as that provided by ISDN or SS7. The signaling messages 106 are further connected to proxy server 120 providing control and IP address information between the server and other central office elements. Proxy server 120 has packetized Internet data connectivity 108 with DSL modem 102, and has a high-speed multiplexed access link 24 to the Internet.

The above connectivity arrangements are stylized to illustrate the inventive matter. Many other arrangements are possible involving devices such as routers, analog-to-digital converters for voice, individual SS7 components, and so on. Nevertheless, the stylized arrangements as presented are suitable for the purpose of this application.

The following is an example of the operation of the arrangement of FIG. 6. Integrated Device 100 can be either the calling or called device. First consider it to be the calling device. Presume the user dials the phone number of another Integrated Device capable of an Internet communication. Integrated Device 100 sends a digital call setup message via messaging system 106 to its serving central office switching system 14. In one possible arrangement, the message may explicitly request an Internet communication; in another possible arrangement, the PSTN may automatically attempt to establish an Internet communication if the calling device has that capability. In either case, according to the general concept of this patent application, the PSTN in the call setup process will provide the IP address of either or both of the calling or called device to the other. In the arrangement under discussion, the PSTN will first assign temporary IP addresses to the calling and called devices to be used for the current call, and then will provide that address to the other device. Once either of the two devices on an Internet call has the IP address of the other, an Internet communication may commence.

In the most straightforward method of operation, the serving central office of the calling device assigns a temporary IP address to the calling device for this call. If Integrated Device 100 does not have a permanently assigned IP address, assigning it a temporary address might be accomplished by switching system 14 querying proxy server 120 to obtain an available IP address, and then delivering it to the calling device 100 via the messaging system 106. The calling device 100 would then use the temporarily assigned IP address for the current call. In a separate step, the serving central office of the called device provides that device with the temporary IP address of the caller.

In this method of operation, proxy server 120 does not function as a true proxy server. Rather, it acts as an agent for the assignment of dynamic IP addresses, which are provided to the calling and called devices for their direct use, and it functions as a router for transporting the resulting data packets to and from the Internet via access link 24. This method of operation could apply to all subsequent examples in which a proxy server is associated with a calling or called device.

However, there are advantages to an arrangement in which the Integrated Device possesses a permanently assigned IP address which is proxied by server 120 into a different address for the duration of the present call, and so the balance of this example and subsequent examples presume that both calling and called devices have a permanently assigned IP address. In this arrangement, switching system 14 directs proxy server 120 to assign a temporary IP address to calling device 100 for the present call; an appropriate response message from the proxy server to the switching system provides the switching system with the temporary IP address.

Presuming that the called device is not also served by the same telco central office, the switching system, or related central office systems such as SS7 component systems, forwards a call setup message incorporating the calling device's temporary IP address on the SS7 messaging system 124 destined for the central office system serving the called device. FIG. 6 can now be viewed as the called system. The called central office system performs a similar dynamic IP address assignment for the called device, and notifies the called device (Integrated Device 100) of the incoming call request and of the temporarily assigned IP address of the calling device. The called device has no way to know whether or not the IP address that has been provided as the IP address of the caller is the caller's true (permanent) IP address, or a temporary, proxied IP address; nor does it need to know. All it needs to know is that it may communicate with the caller via the supplied IP address. The called device rings, the user answers, the called device sends multimedia Internet data to the calling device addressed to the calling device's temporarily assigned IP address, and a multimedia communications over the Internet commences. Optionally, the PSTN provides the calling device with the temporary IP address of the called device, and the calling device initiates the Internet communication.

The operation of the proxied address assignment is the same for either the calling or called device, depending on whether the associated data is being sent or received. Internet data packets have source and destination IP addresses. Multimedia communications data packets originating from local Integrated Device 100 bear the local device's permanently assigned IP address as the source address, and the temporarily assigned IP address of the remote device as the destination address. These locally originating data packets travel across packetized data path 108 to proxy server 120. The proxy server changes the source address to the local device's temporary IP address, and then sends the packetized data across Internet access link 24 to the Internet. The remote device and its proxy server perform the same operation for data originated by the remote device. Thus, for data packets of an Internet call sent between two proxy servers, both source and destination addresses are the temporarily assigned IP addresses. An Internet snooper would not be able to associate those IP addresses with either of the calling or called parties. When the proxy server 120 receives Internet data bearing the temporary IP address of its local Integrated Device 100 as the destination address, it translates the destination address into the device's permanent IP address, and then delivers the data packet to the local Integrated Device 100 via packetized data path 108. Whether the packets are being sent or received, each device sees its own permanent IP address and the remote device's temporary IP address.

FIG. 6 can also be used to illustration the operation of the PSTN assigning and delivering a secret encryption key to the calling and called devices. Assume that a computer system associated with the central office switching system 14, such as proxy server 120 (for this purpose simply referred to as "server 120"), generates or maintains a library of secret keys. Also assume that the central office system providing subscriber services to the calling device is responsible for assigning a secret encryption key to an Internet call, and assume, for the moment, that user device 100 is the caller. At the time of call establishment (i.e., upon receiving a call setup request message from user device 100), switching system 14, or equivalent controlling entity in the telco central office systems, sends a message to server 120 via digital messaging arrangement 106 requesting the assignment of a secret key, which is returned from server 120 via the same digital messaging path. Switching system 14 then sends a message containing the key to user device 100, also via messaging arrangement 106.

In executing the call setup request, switching system 14 will forward the call setup request (or an equivalent message) on to the remote central office via SS7 messaging system 124. This call setup process will now incorporate a secret key as a message element of an existing message type, or will encompass the sending of a new message type to incorporate the secret key. Now viewing the drawing as representing the called party, switching system 14 receives such a secret key message via SS7 messaging system 124, and delivers the secret key message to called device 100 via messaging arrangement 106. If user device 106 answers the call, then communications data it generates are encoded using the supplied secret key, and similarly, communications data received from the caller, which has been encoded with that secret key, will be decoded with the secret key and presented to the user. The resulting communications traversing either the Internet or the PSTN are thus encrypted for privacy and security.

Figure 7:
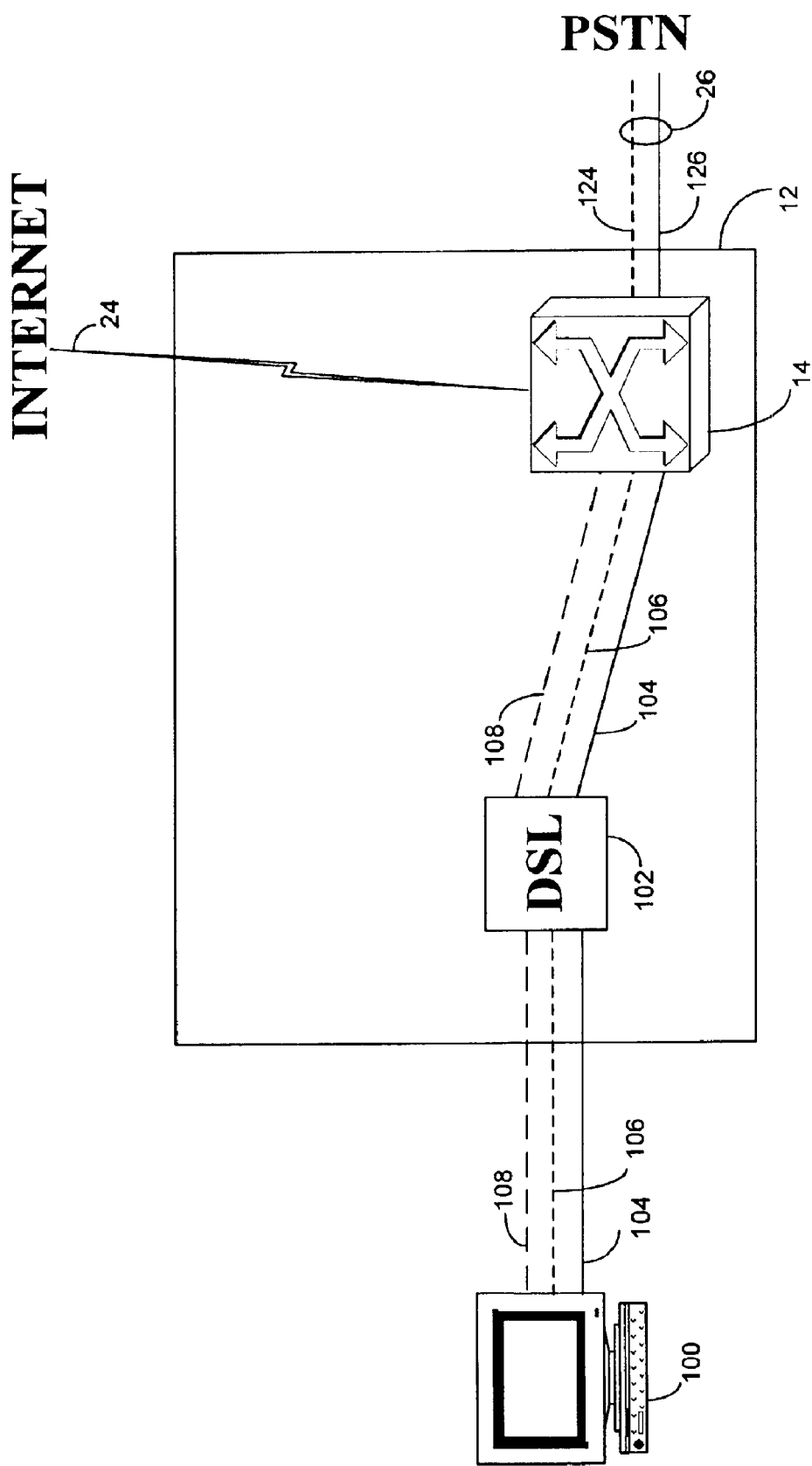
FIG. 7 is an alternative version of FIG. 6 in which the functions of the proxy server are incorporated into the central office switching system.

FIG. 7 illustrates an optional arrangement in which the functions of proxy server 120 are integrated into switching system 14, resulting in substantial simplification from the arrangement of FIG. 6. Referring to FIG. 7, there is an Integrated Device 100, such as a user display phone, served by a DSL arrangement from telco C.O. 12 and switching system 14. The central office 12 and switching system 14 are interconnected to other equivalent PSTN systems via trunking circuits 126 and SS7 messaging circuits 124, which together comprise the multiplexed communications links 26. The DSL service is provided by a DSL modem 102 located in the C.O. 12, and by an equivalent DSL modem capability (not shown) incorporated into Integrated Device 100. The DSL system including DSL modem 102 conveys packetized Internet data 108 and voice-grade information 104. Optionally, the voice-grade information 104 may be packetized and transported via the DSL carrier-wave medium. The DSL system is enhanced over conventional designs to provide connectivity and conveyance to digital messaging 106 between the switching system 14—or other appropriate PSTN elements such as SS7 systems—and Integrated Device 100, wherein the digital messaging 106 comprises call setup, call management, and similar signaling messages such as that provided by ISDN or SS7. Switching system 14 has packetized Internet data connectivity 108 with DSL modem 102, and has a high-speed multiplexed access link 24 to the Internet.

Figure 8:
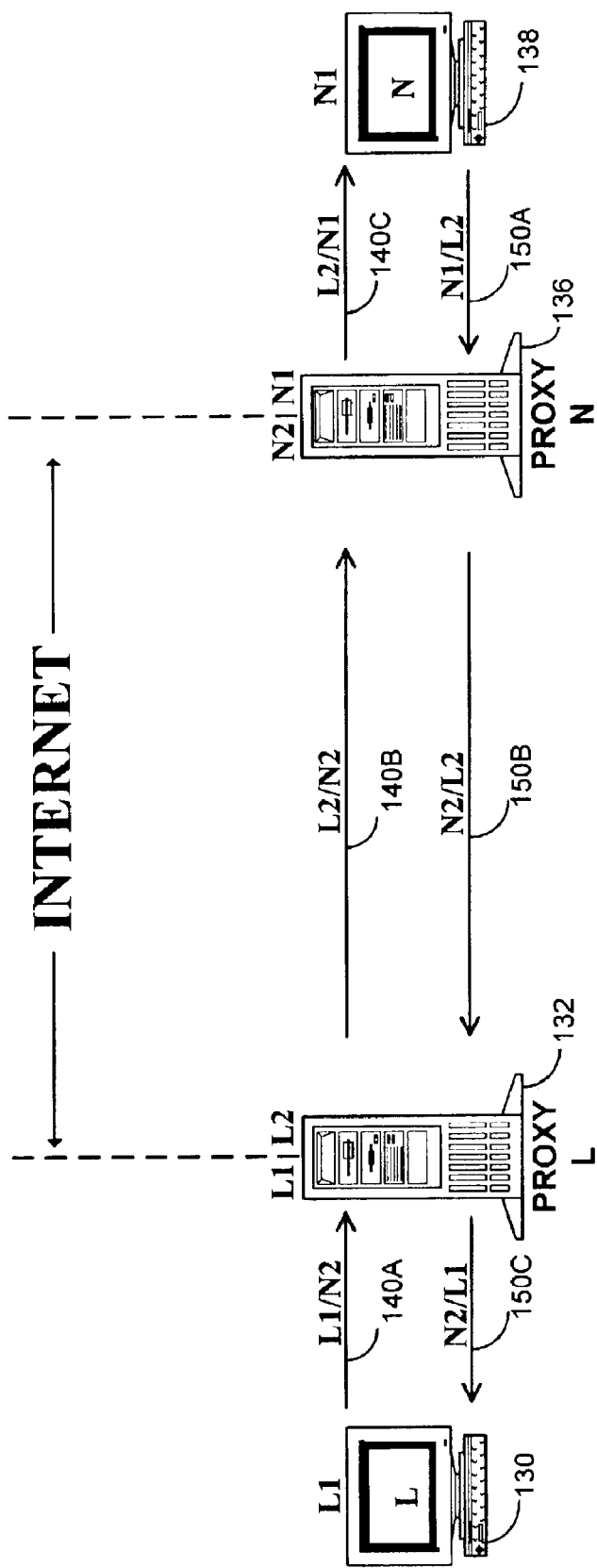
FIG. 8 is a schematic diagram illustrating the address assignments used in a proxy server arrangement in which each of the calling and called devices are represented by a proxy server.

FIG. 8 illustrates the operation that was just described for FIG. 6 and FIG. 7, whether there is a proxy server as a separate device, or whether the proxy server function is incorporated into the switching system. Assume the following: user device L (130), the calling device, has a permanent IP address L1, and user device N (138), the called device, has a permanent IP address N1; proxy server L (132) has been assigned the temporary IP address L2, and proxy server N (136) has been assigned the temporary IP address N2. Temporary IP address N2 is provided to calling user device L as the called device's IP address, and temporary IP address L2 is provided to called device N as the calling device's IP address. The permanent user IP addresses L1 and N1 are never transmitted across the Internet in conjunction with a telephony-style Internet call.

Directional arrows 140A, 140B, and 140C refer to data traveling from user device L to user device N. Internet data messages originating at L and destined for N (140A) have addresses L1/N2 (address format: source/destination). When Internet data messages from user device L are received by proxy server L, the source address is changed to L2, and the packet with addresses L2/N2 (140B) is sent on the Internet to proxy server N. When these data messages are received by proxy server N, the destination address is changed to N1, user device N's permanent IP address, and the message with addresses L2/N1 (140C) is delivered to user device N.

In the reverse direction for data messages traveling from user device N to user device L, referring to arrows 150A, 150B, and 150C, Internet data messages originating at N and destined for L (150A) have addresses N1/L2. When Internet data messages from user device N are received by proxy server N, the source address is changed to N2, and the packet with addresses N2/L2 (150B) is sent on the Internet to proxy server L. When these data messages are received by proxy server L, the destination is changed to L1, user device L's permanent IP address, and the message with addresses N2/L1 (150C) is delivered to user device L.

The following is a summary of the key factors of the arrangement just described. The calling device (or user) knows the telephone number of the called device. The called device may be supplied with the telephone number of the calling device by Caller-ID, unless the calling device has a non-published number. The calling device has been enabled to establish an Internet multimedia communication with the called device simply by dialing its telephone number. Each device on a resulting Internet call is assigned a temporary IP address, and knows only the temporary IP address of the remote device. At the termination of the call, the respective switching systems for the calling and called devices direct the proxy servers to disassociate the temporary IP addresses from the calling and called devices. Thus the privacy and security of the devices and the data they transmit are protected even though data from these devices is sent openly across the Internet. In order to provide non-published telephone number service for Internet communications, both the subscriber's telephone number and IP address must be held private. Among other benefits, this arrangement protects subscribers of non-published telephone numbers who engage in Internet communications by shielding the associated IP address from exposure.

The topic now changes to address another security issue. As mentioned previously, if a user can access a caller's IP address, they can use a trace route program to determine the approximate location of the caller.

Figure 9:
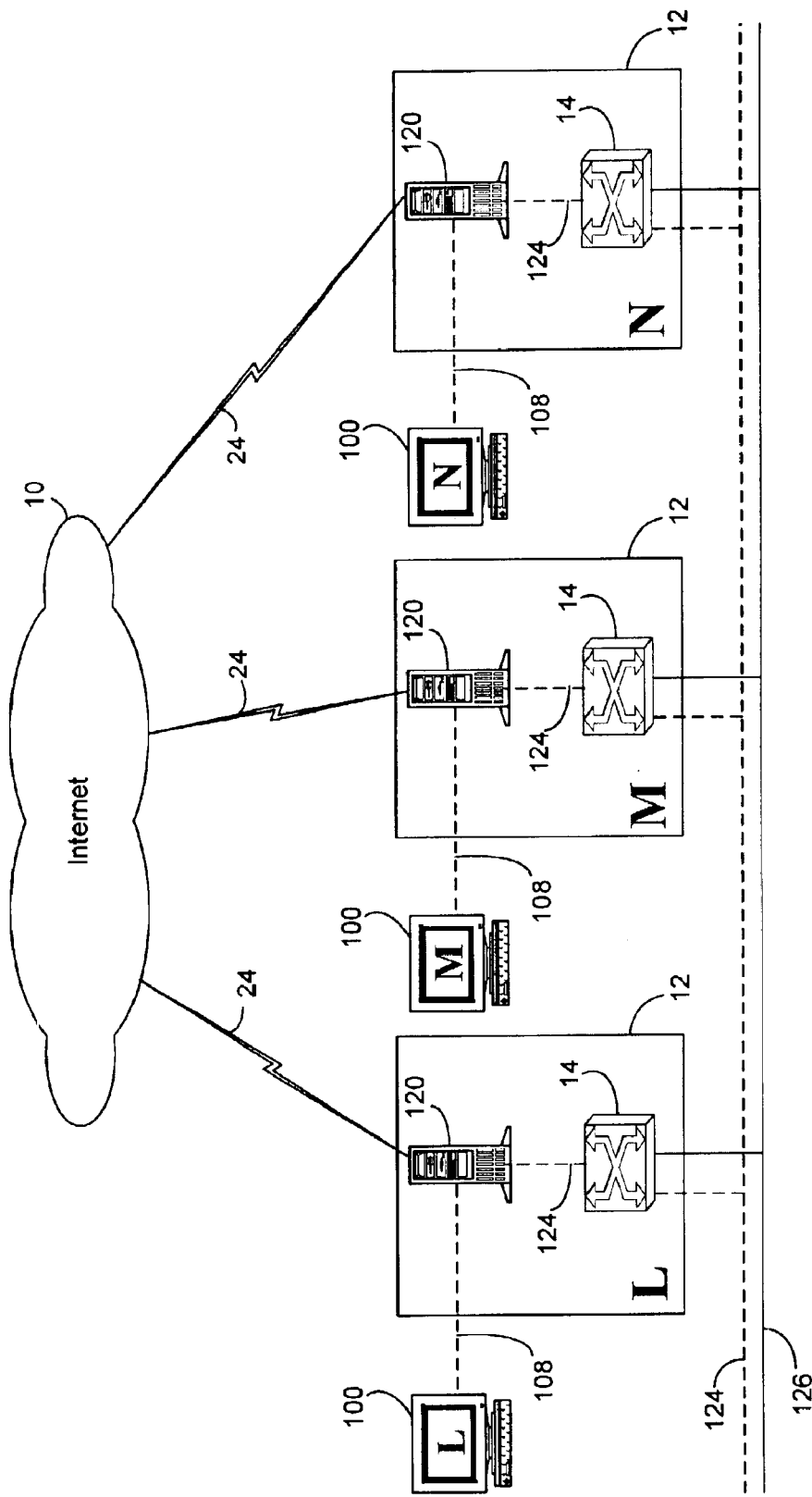
FIG. 9 is a schematic diagram illustrating an arrangement in which Internet data bearing dynamically assigned IP addresses is retransmitted through an intermediate proxy server to shield the caller's location.

FIG. 9 illustrates an arrangement in which Internet data bearing dynamically assigned IP addresses is retransmitted through an intermediate proxy server to shield the caller's location. FIG. 9 draws on the concepts introduced in FIG. 6, but presents them in a simplified manner for ease of illustration and discussion. The Internet is shown stylistically as 10. Three telco central offices 12 are labeled L, M, and N, each having a subscriber Integrated Device 100, such as a user display phone, connected to a proxy server 120 by a packetized data connection 108 suitable for carrying Internet data. Central offices 12 have switching systems 14, which are connected to SS7 network 124 and to multiplexed trunk circuits 126. SS7 network 124, or an equivalent digital messaging communications medium, extends to proxy servers 120, which also have high speed multiplexed Internet access links 24. Although not shown in this diagram, as stated previously, the functions of proxy servers 120 may optionally be integrated into central office switching systems 14.

The operation of an Internet call between any two devices, such as user device L and N, would proceed similarly to that described for FIG. 6 with regard to elements of the PSTN, such as proxy servers 120, assigning a temporary IP address to the calling and called devices for an individual call and providing the temporary IP address of one device to the other device in the call setup process. In the absence of an intermediate proxy server, Internet data traffic between L and N would transit the Internet directly between proxy server L and N. However, an additional step takes place in the call setup process of the current arrangement. An intermediate proxy server, such as M, is selected, and the IP address of that server, or a temporary IP address "owned" by that server, are provided to the calling and called devices.

Figure 10:
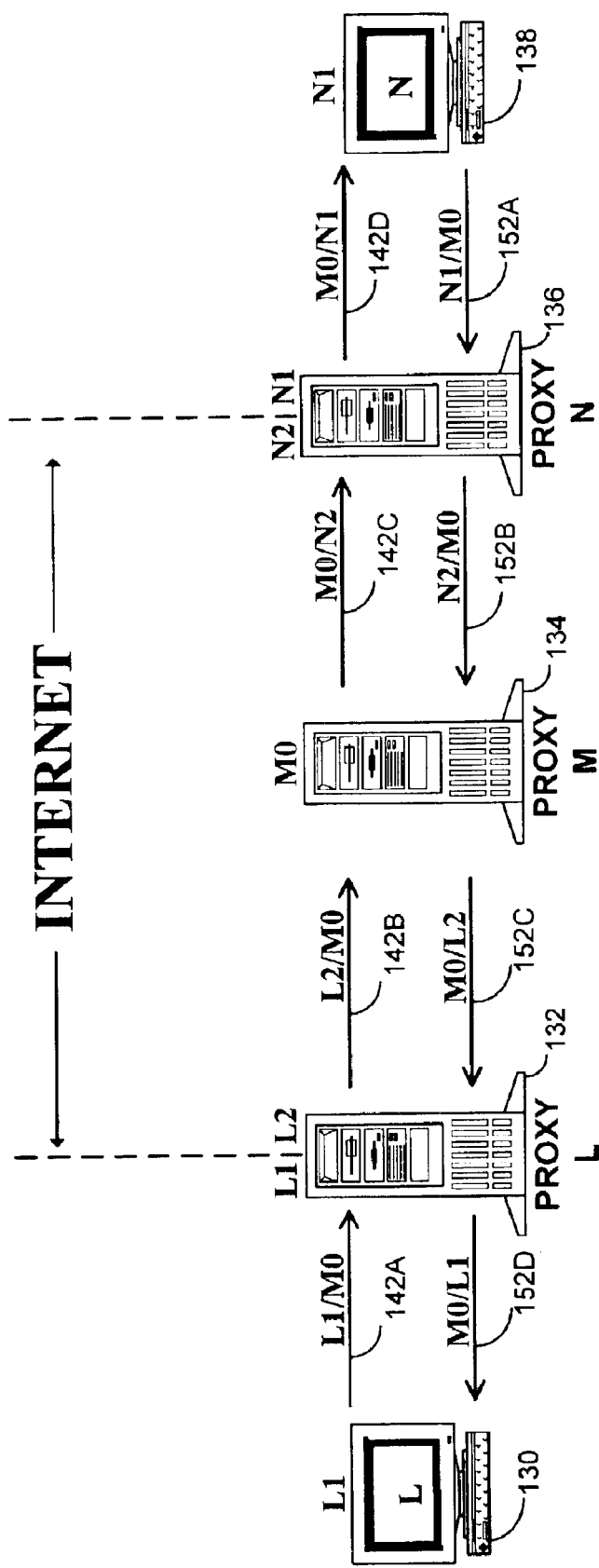
FIG. 10 schematically depicts an extension of FIG. 8 in which an intermediate proxy server is used in addition to the proxy servers of the calling and called devices.

FIG. 10 further illustrates the concept of an intermediate proxy server. Assume the following: intermediate proxy server M (134) has available IP address M0 to assign temporarily for a call between L and N; user device L (130) has a permanent IP address L1, and user device N (138) has a permanent IP address N1; proxy server L (132) has been assigned the temporary IP address L2, and proxy server N (136) has been assigned the temporary IP address N2. Temporary IP address M0 is provided to calling user device L as the called device's IP address, and is also provided to called device N as the calling device's IP address. So, L thinks it is talking to M0, and N thinks it is talking to M0.

Directional arrows 142A, 142B, 142C, and 142D refer to data traveling from user device L to user device N. Internet data messages originating at L and destined for N (142A) have addresses L1/M0 (address format: source/destination). When Internet data messages from user device L are received by proxy server L, the source address is changed to L2, and the packet with addresses L2/M0 (142B) is sent on the Internet to proxy server M. When these data messages are received by proxy server M, the source address is changed to M0, the destination address is changed to N2, and the packet with addresses M0/N2 (142C) is sent on the Internet to proxy server N. When these data messages are received by proxy server N, the destination address is changed to N1, user device N's permanent IP address, and the message with addresses M0/N1 (142D) is delivered to user device N.

In the reverse direction, data messages traveling from user device N to user device L are referred to by arrows 152A, 152B, 152C, and 152D. Internet data messages originating at N and destined for L (152A) have addresses N1/M0. When Internet data messages from user device N are received by proxy server N, the source address is changed to N2, and the packet is sent on the Internet with addresses N2/M0 (152B) to proxy server M. When these data messages are received by proxy server M, the source address is changed to M0, the destination address is changed to L2, and the packet with addresses M0/L2 (152C) is sent on the Internet to proxy server L. When these data messages are received by proxy server L, the destination is changed to L1, user device L's permanent IP address, and the message with addresses M0/L1 (152D) is delivered to user device L.

FIG. 10 illustrates a symmetrical arrangement in which a single intermediate proxy server sits in the path of messages sent between the calling and called devices. However, a workable arrangement could be constructed with two intermediate proxy servers, one in the path of messages sent from the calling device to the called device, and one in the path of messages sent from the called device to the calling device. From a practical perspective, this arrangement could be constructed with a single intermediate proxy server that performs the functions of two physical proxy servers, but for conceptual purposes the arrangement is presented here as two separate physical proxy servers. Certainly the functions of multiple proxy servers could be integrated into a single device. And, as suggested previously, proxy servers are logical functions whose role could be subsumed into other systems such as a Central Office switch.

Furthermore, each of the calling and called devices could be assigned two temporary IP addresses wherein communications with each of the two intermediate proxy servers is conducted with a unique IP address.

This arrangement would make it extremely difficult for Internet eavesdroppers to listen in on a conversation because they would be unlikely to be able to capture and associate the message stream from the caller to the called party with the message stream from the called party to the caller. Thus, at best, an Internet snoop would be able to listen in on one-half of a conversation, without being able to identify either the caller or called party.

Figure 11:
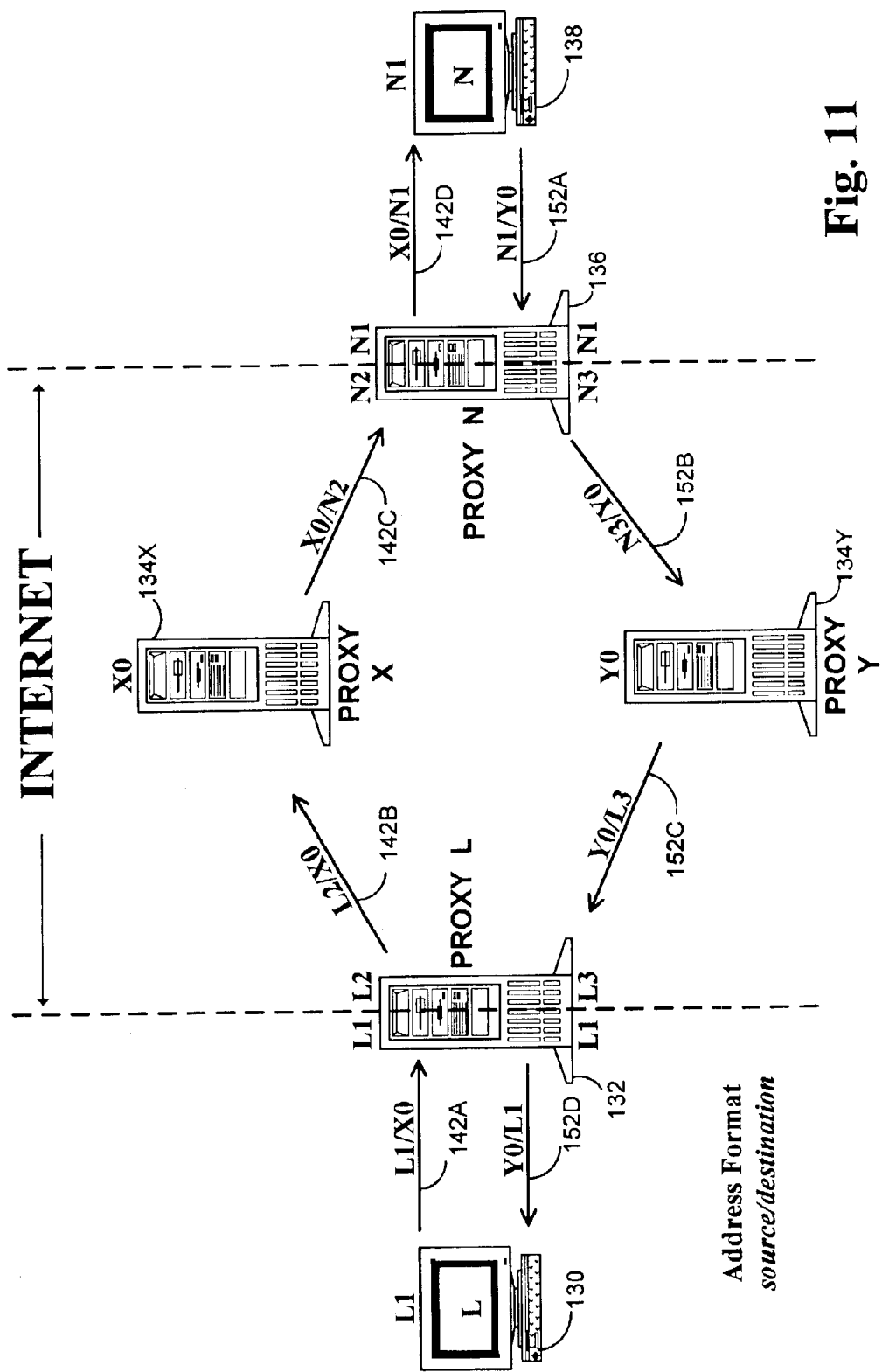
FIG. 11 depicts a preferred embodiment of this invention, which uses two intermediate proxy servers, one in the communications path of messages sent from the calling device to the called device, and one in the path of messages sent from the called device to the calling device.

FIG. 11 illustrates this last arrangement, which is the preferred embodiment of this invention. The elements of this diagram are similar to those of FIG. 10, with the prominent addition of a second intermediate proxy server. Assume the following: intermediate proxy server X (134X) has available IP address X0 to assign temporarily for a call between L and N, and intermediate proxy server Y (134Y) has available IP address Y0 to assign temporarily to the same call; user device L (130) has a permanent IP address L1, and user device N (138) has a permanent IP address N1; proxy server L (132) has been assigned the temporary IP address L2, and proxy server N (136) has been assigned the temporary IP address N2. Temporary IP address X0 is provided to calling user device L for sending messages to the called device, and temporary IP address Y0 is provided to calling user device L for receiving messages from the called device. Inversely, temporary IP address Y0 is provided to called user device N for sending messages to the calling device, and temporary IP address X0 is provided to called user device N for receiving messages from the calling device.

Directional arrows 142A, 142B, 142C, and 142D refer to data traveling from user device L to user device N. Internet data messages originating at L and destined for N (142A) have addresses L1/X0 (address format: source/destination). When Internet data messages from user device L are received by proxy server L, the source address is changed to L2, and the packet with addresses L2/X0 (142B) is sent on the Internet to proxy server X. When these data messages are received by proxy server X, the source address is changed to X0, the destination address is changed to N2, and the packet with addresses X0/N2 (142C) is sent on the Internet to proxy server N. When these data messages are received by proxy server N, the destination address is changed to N1, user device N's permanent IP address, and the message with addresses X0/N1 (142D) is delivered to user device N.

In the reverse direction, data messages traveling from user device N to user device L are referred to by arrows 152A, 152B, 152C, and 152D. Internet data messages originating at N and destined for L (152A) have addresses N1/Y0. When Internet data messages from user device N are received by proxy server N, the source address is changed to N3, and the packet is sent on the Internet with addresses N3/Y0 (152B) to proxy server Y. When these data messages are received by proxy server Y, the source address is changed to Y0, the destination address is changed to L3, and the packet with addresses Y0/L3 (152C) is sent on the Internet to proxy server L. When these data messages are received by proxy server L, the destination is changed to L1, user device L's permanent IP address, and the message with addresses Y0/L1 (152D) is delivered to user device L.

For security purposes, user devices L and N could be provided only with the intermediate proxy server IP address from which they will be receiving messages, and thus directed to send messages to that address. The proxy server associated with L and N would then be required to change the destination address to that of the other intermediate proxy server. For example, L would be provided only with temporary IP address Y0, and would not only receive messages from that address, but would send messages to that address. Proxy server L would change the destination address of messages sent by L from Y0 to X0. From a security perspective, user device L would be provided with one less piece of information, and the less information provided to user devices, the more secure the overall system is.

Recall the previous assertion that the two intermediate proxy servers could be logical functional elements of a single device. The role of the intermediate proxy server is essentially one of assigning IP addresses at the initiation of a communication between end devices, and then copying packets and swapping addresses as it retransmits data once communications have commenced between end points. The nature of this operation is readily implemented in hardware, and thus the intermediate proxy server function can be constructed into a high-speed device capable of conducting very many concurrent communications sessions (perhaps tens of thousands).

Additionally, such a device is uniquely positioned in the communications stream to provide multi-party bridging capability, enabling audio, video, and graphical conferencing between an essentially unlimited number of end point devices. As mentioned in the preceding paragraph, the transmission roll of the intermediate proxy server is to retransmit received data packets by coping incoming packets to an outgoing communications line, and to translate addresses in the outgoing packets as has been previously described. As an example, for a three-party conference the process is simply to make two copies of each received data packet, rather than one, with appropriate address changes for each intended receiver, and send off the copied packets. For a call between A, B, and C, data from A is copied and sent to B and C, and similarly data from B is copied and sent to A and C, and so on. Thus, a multi-party conference can be maintained by such a device by simply making a copy of each received data packet to retransmit to each of the other parties to the conference. Furthermore, all the parties to such a conference enjoy the benefit of privacy and security of their communications, as has been previously described, including the ability to employ secret key encryption for all members of a multi-party conference.

The privacy and security risks addressed in this application—exposure of a user's IP address, discovery of a user's approximate location, eavesdropping on a private communication—apply to any telecommunications-style communications conducted across the Internet. Internet telephony communications are commonly referred to as IP telephony, or Voice over IP (VoIP), and include arrangements for one person to establish a multimedia communications with another person across the Internet. These arrangements use the Internet as the medium for call control signaling messages to manage call establishment and disconnection, rather than the SS7 signaling network of the PSTN. Although the SS7 network provides additional privacy and security benefits, the privacy and security benefits provided by temporary IP addresses and local and intermediate proxy servers, as illustrated in FIGS. 8, 10, and 11, apply to any Internet telephony communications, whether or not the PSTN is involved in establishing those communications. Thus, these illustrations should be interpreted as being generic in nature, independent of the mechanism used for call management signaling or for assigning and providing dynamic IP addresses to the communicating devices or the associated proxy servers.

In contemplating connectivity arrangements in telco central offices, messaging schemes and protocols, and the like, as suggested by the previous discussions, it should be understood that there may be a myriad of ways of accomplishing these goals. For example, there is a substantial variety of equipment and systems used in telco central offices from numerous vendors, and so, for example, there might be any number of suitable ways of providing an Internet connection to a telco C.O. in order to provide an Internet messaging pathway to an Integrated Device. Similarly, the above discussions have portrayed messaging sequences that might take place in creating an Internet communication, and it should be understood that these are stylized sequences or protocols, and that the actual implementations might employ much more rigorous and sophisticated protocols for this purpose. In addition, the messaging processes might benefit from modifications, extensions, or enhancements to existing protocols for optimization to this purpose. However, the current lack of these modifications and the like should not be construed to prohibit this invention as they are implementation steps manageable by those knowledgeable in the art.

Having thus described the invention in rather full detail, it will be understood that such detail need not be strictly adhered to, but that further changes and modifications may suggest themselves to one skilled in the art falling within the scope of the present invention as defined by the subjoined claims.

What is claimed is:

1. A system for integrating the Internet with the PSTN by initiating an Internet connection when a calling device calls the telephone number of a called device on the Public Switched Telephone Network (PSTN), comprising:
   (a) a plurality of Integrated Devices, each having Internet connectivity and having telephone connectivity with an associated a telephone number, such that a connection for said Integrated Devices is established by telephonically dialing said telephone number via the PSTN;
   (b) said Integrated Devices further comprising digital messaging capability to the PSTN;
   (c) said calling and called devices being Integrated Devices;
   (d) the PSTN having a digital messaging capability for conveying messages containing Internet Protocol (IP) addresses;
   (e) means for the PSTN to assign a first IP address to a first one of said calling and called devices; and
   (f) means for the PSTN to provide said first IP address of said first one of said calling and called devices to a second one of said calling and called devices to be used as the destination address of Internet messages sent by said second one of said calling and called devices to said first one of said calling and called devices.

2. A system for integrating the Internet with the PSTN as recited in claim 1, further comprising:
   (a) means for the PSTN to assign a second IP address to a second one of said calling and called devices;
   (b) means for the PSTN to provide said second IP address of said second one of said calling and called devices to said first one of said calling and called devices to be used as the destination address of Internet messages sent by said first one of said calling and called devices to said second one of said calling and called devices;
   (c) a first proxy server associated with said first of said calling and called devices and arranged to receive said Internet messages sent to said second IP address of said second one of said calling and called devices by said first one of said calling and called devices; and
   (d) said first proxy server arranged to resend said Internet messages from said first one of said calling and called devices to said second one of said calling and called devices, wherein said resent messages bear said first IP address as the source address.

3. A system for integrating the Internet with the PSTN as recited in claim 2, further comprising:
   (a) said second one of said calling and called devices arranged to send Internet messages to said first IP address of said first one of said calling and called devices;
   (b) a second proxy server associated with said second of said calling and called devices and arranged to receive said Internet messages sent to said first IP address of said first one of said calling and called devices by said second one of said calling and called devices; and
   (c) said second proxy server arranged to resend said Internet messages from said second one of said calling and called devices to said first one of said calling and called devices, wherein said resent messages bear said second IP address as the source address.

4. A system for integrating the Internet with the PSTN as recited in claim 2, wherein said proxy first server is a function provided by a telephone central office switching system which provides telephone services to subscribers.

5. A system for integrating the Internet with the PSTN as recited in claim 1, wherein said means for the PSTN to provide said first IP address of said first one of said calling and called devices to said second one of said calling and called devices is provided by the PSTN digital messaging capability.

6. A system for voice and multimedia communications on the Internet which provides security for the Internet Protocol (IP) addresses and data transmissions of the calling and called devices, comprising:
   (a) a plurality of user communications devices arranged for Internet communications, and comprising the calling and called devices;
   (b) a calling device proxy server associated with said calling device (caller), and a called device proxy server associated with said called device (callee);

(c) means to provide an IP address of a called device proxy server to said calling device to be used as the destination address of Internet messages sent by said calling device to said called device;

(d) said calling device arranged to send caller Internet messages to said IP address of said called device proxy server, said messages intended for said called device;

(e) said calling device proxy server arranged to intercept said caller Internet messages and to resend said caller Internet messages to said called device proxy server, said resent caller messages bearing the IP address of said calling device proxy server as the source address;

(f) said called device proxy server having means to receive said caller Internet messages and to resend said caller Internet messages to said called device;

(g) said called device having means to receive said caller Internet messages resent from said called device proxy server;

(h) means to provide an IP address of a calling device proxy server to said called device to be used as the destination address of Internet messages sent by said called device to said calling device;

(i) said called device arranged to send callee Internet messages to said IP address of said calling device proxy server, said messages intended for said calling device;

(j) said called device proxy server arranged to intercept said callee Internet messages and to resend said callee Internet messages to said calling device proxy server, said resent callee messages bearing the IP address of said called device proxy server as the source address;

(k) said calling device proxy server having means to receive said callee Internet messages and to resend said callee Internet messages to said calling device; and (l) said calling device having means to receive said callee Internet messages resent from said calling device proxy server.

7. A system for integrating the Internet with the PSTN by initiating an Internet connection when a calling device calls the telephone number of a called device on the Public Switched Telephone Network (PSTN), comprising:

(a) a plurality of Integrated Devices, each having Internet connectivity and having telephone connectivity with an associated a telephone number, such that a connection for said Integrated Devices is established by telephonically dialing said telephone number via the PSTN;

(b) said Integrated Devices further comprising digital messaging capability to the PSTN;

(c) said calling and called devices being Integrated Devices;

(d) the PSTN having a digital messaging capability for conveying messages containing Internet Protocol (IP) addresses;

(e) means for the PSTN to assign at least one proxy server as an intermediate device for Internet communications between said calling and called devices by providing an Internet Protocol (IP) address of an intermediate proxy server to said calling device as the IP address of the called device, and by providing an IP address of an intermediate proxy server to said called device as the IP address of the calling device;

(f) a first one of said calling and called devices being arranged to send Internet messages to said intermediate proxy server, said Internet messages ultimately intended for a second one of said calling and called devices;

(g) a second one of said calling and called devices arranged to send Internet messages to said intermediate proxy server, said Internet messages ultimately intended for said first one of said calling and called devices; and (h) means for said intermediate proxy server to resend Internet messages received from a first one of said calling and called devices to a second one of said calling and called devices, and to resend Internet messages received from a second one of said calling and called devices to a first one of said calling and called devices, thus enabling an Internet communication between said calling and called devices.

8. A system for integrating the Internet with the PSTN as recited in claim 7, further comprising:

(a) means for the PSTN to assign a first IP address to a first one of said calling and called devices to be used as the source address of Internet messages sent from said first one of said calling and called devices; and (b) means for the PSTN to provide said first IP address of said first one of said calling and called devices to said intermediate proxy server to be used as the destination address of Internet messages sent by said intermediate proxy server to said first one of said calling and called devices.

9. A system for integrating the Internet with the PSTN as recited in claim 7, wherein said intermediate proxy server is a function provided by a telephone central office switching system which provides telephone services to subscribers.

10. A system for integrating the Internet with the PSTN as recited in claim 7, wherein said system provides multi-party bridging between more than two calling and called devices, said system further comprising means for said intermediate proxy server to resend Internet messages received from one of a plurality calling and called devices to the others of said plurality of calling and called devices.

11. A system for integrating the Internet with the PSTN as recited in claim 7, wherein said means for the PSTN to assign a proxy server as an intermediate device for Internet communications between said calling and called devices is provided by the PSTN digital messaging capability.

12. A system for integrating the Internet with the PSTN as recited in claim 7, wherein said PSTN digital messaging capability includes the SS7 network.

13. A system for integrating the Internet with the PSTN as recited in claim 7, wherein said PSTN digital messaging capability includes the ISDN network.

14. A system for voice and multimedia communications on the Internet which provides security for the Internet Protocol (IP) addresses and data transmissions of the calling and called devices, comprising:

(a) a plurality of user communications devices arranged for Internet communications, and comprising the calling and called devices;

(b) means to assign at least one proxy server as an intermediate device for Internet communications between said calling and called devices by providing an IP address of an intermediate proxy server to said calling device as the IP address of the called device, and by providing an IP address of an intermediate proxy server to said called device as the IP address of the calling device;

(c) a first one of said calling and called devices being arranged to send Internet messages to said intermediate proxy server, said Internet messages ultimately intended for a second one of said calling and called devices;

(d) a second one of said calling and called devices arranged to send Internet messages to said intermediate proxy server, said Internet messages ultimately intended for said first one of said calling and called devices; and (e) means for said intermediate proxy server to resend Internet messages received from a first one of said calling and called devices to a second one of said calling and called devices, thus enabling an Internet communication between said calling and called devices.

15. A system for voice and multimedia communications on the Internet as recited in claim 14, further comprising:

(a) means to assign a first IP address to a first one of said calling and called devices to be used as the source address of Internet messages sent from said first one of said calling and called devices; and (b) means to provide said first IP address of said first one of said calling and called devices to said intermediate proxy server to be used as the destination address of Internet messages sent by said intermediate proxy server to said first one of said calling and called devices.

16. A system for voice and multimedia communications on the Internet as recited in claim 14, wherein said system provides multi-party bridging between more than two calling and called devices, said system further comprising means for said intermediate proxy server to resend Internet messages received from one of a plurality calling and called devices to the others of said plurality of calling and called devices.

17. A system for integrating the Internet with the PSTN by initiating an Internet connection when a calling device calls the telephone number of a called device on the Public Switched Telephone Network (PSTN), comprising:

(a) a plurality of Integrated Devices, each having Internet connectivity and having telephone connectivity with an associated a telephone number, such that a connection for said Integrated Devices is established by telephonically dialing said telephone number via the PSTN;

(b) said Integrated Devices further comprising digital messaging capability to the PSTN;

(c) said calling and called devices being Integrated Devices;

(d) the PSTN having a digital messaging capability for conveying messages containing Internet Protocol (IP) addresses;

(e) a calling device proxy server associated with said calling device, a called device proxy server associated with said called device, and an intermediate proxy server;

(f) means for the PSTN to assign at least one intermediate proxy server as an intermediate device for Internet communications between the calling and called devices by providing an IP address of an intermediate proxy server to said calling device as the IP address of the called device, and by providing an IP address of an intermediate proxy server to said called device as the IP address of the calling device;

(g) means for the PSTN to assign an IP address of a calling device proxy server to said calling device, said calling device proxy server IP address to be used as the destination address of Internet messages sent by said intermediate proxy server to said calling device;

(h) means for the PSTN to provide said calling device proxy server IP address to said intermediate proxy server;

(i) said calling device proxy server arranged to respond to Internet messages sent from said intermediate proxy server to said calling device proxy server IP address by resending such messages to said calling device;

(j) means for the PSTN to assign an IP address of a called device proxy server to said called device, said called device proxy server IP address to be used as the destination address of Internet messages sent by said intermediate proxy server to said called device;

(k) means for the PSTN to provide said called device proxy server IP address to said intermediate proxy server; and (l) said called device proxy server arranged to respond to Internet messages sent from said intermediate proxy server to said called device proxy server IP address by resending such messages to said called device.

18. A system for integrating the Internet with the PSTN as recited in claim 17, further comprising:

(a) a first one of said calling and called devices being associated with a respective first one of said calling and called device proxy servers, and a second one of said calling and called devices being associated with a respective second one of said calling and called device proxy servers;

(b) said first one of said calling and called devices being arranged to send Internet messages to said intermediate proxy server, said Internet messages ultimately intended for a second one of said calling and called devices;

(c) said respective first one of said calling and called device proxy servers arranged to intercept said messages sent by said first one of said calling and called devices and to resend said messages to said intermediate proxy server, said resent messages bearing said IP address of said respective first one of said calling and called device proxy servers as the source address;

(d) said intermediate proxy server arranged to receive said Internet messages from said respective first one of said calling and called device proxy servers and to resend said Internet messages to said IP address of said respective second one of said calling and called device proxy servers associated with said second one of said calling and called devices, said resent messages bearing said IP address of said intermediate proxy server as the source address; and (e) said respective second one of said calling and called device proxy servers arranged to receive said Internet messages from said intermediate proxy server, and to resend said Internet messages to said second one of said calling and called devices.

19. A system for integrating the Internet with the PSTN as recited in claim 18, further comprising:

(a) said second one of said calling and called devices sending Internet messages to said intermediate proxy server, said Internet messages ultimately intended for a first one of said calling and called devices;

(b) said respective second one of said calling and called device proxy servers arranged to intercept said messages sent by said second one of said calling and called devices and to resend said messages to said intermediate proxy server, said resent messages bearing said IP address of said respective second one of said calling and called device proxy servers as the source address;

(c) said intermediate proxy server arranged to receive said Internet messages from said respective second one of said calling and called device proxy servers and to resend said Internet messages to said IP address of said respective first one of said calling and called device proxy servers associated with said first one of said calling and called devices, said resent messages bearing said IP address of said intermediate proxy server as the source address; and (d) said respective first one of said calling and called device proxy servers arranged to receive said Internet messages from said intermediate proxy server, and to resend said Internet messages to said first one of said calling and called devices.

20. A system for integrating the Internet with the PSTN as recited in claim 17, wherein said system provides multi-party bridging between more than two calling and called devices, said system further comprising means for said intermediate proxy server to resend Internet messages received from one of a plurality calling and called devices to the others of said plurality of calling and called devices.

21. A system for integrating the Internet with the PSTN as recited in claim 17, wherein said proxy servers are functions provided by a telephone central office switching system which provides telephone services to subscribers.

22. A system for integrating the Internet with the PSTN as recited in claim 17, wherein said means for the PSTN to provide temporary IP addresses to said first and second ones of said calling and called devices and to said intermediate proxy server is provided by the PSTN digital messaging capability.

23. A system for integrating the Internet with the PSTN as recited in claim 17, wherein said PSTN digital messaging capability includes the SS7 network.

24. A system for integrating the Internet with the PSTN as recited in claim 17, wherein said PSTN digital messaging capability includes the ISDN network.

25. A system for voice and multimedia communications on the Internet which provides security for the Internet Protocol (IP) addresses and data transmissions of the calling and called devices, comprising:

(a) a plurality of user communications devices arranged for Internet communications, and comprising the calling and called devices;

(b) a calling device proxy server associated with said calling device, a called device proxy server associated with said called device, and an intermediate proxy server;

(c) means to assign at least one intermediate proxy server as an intermediate device for Internet communications between the calling and called devices by providing an IP address of an intermediate proxy server to said calling device as the IP address of the called device, and by providing an IP address of an intermediate proxy server to said called device as the IP address of the calling device;

(d) means to assign an IP address of a calling device proxy server to said calling device, said calling device proxy server IP address to be used as the destination address of Internet messages sent by said intermediate proxy server to said calling device;

(e) means to provide said calling device proxy server IP address to said intermediate proxy server;

(f) said calling device proxy server being arranged to respond to Internet messages sent from said intermediate proxy server to said calling device proxy server IP address by resending such messages to said calling device;

(g) means to assign an IP address of a called device proxy server to said called device, said called device proxy server IP address to be used as the destination address of Internet messages sent by said intermediate proxy server to said called device;

(h) means to provide said called device proxy server IP address to said intermediate proxy server; and (i) said called device proxy server being arranged to respond to Internet messages sent from said intermediate proxy server to said called device proxy server IP address by resending such messages to said called device.

26. A system for voice and multimedia communications on the Internet as recited in claim 25, further comprising:

(a) a first one of said calling and called devices being associated with a respective first one of said calling and called device proxy servers, and a second one of said calling and called devices being associated with a respective second one of said calling and called device proxy servers;

(b) said first one of said calling and called devices being arranged to send Internet messages to said intermediate proxy server, said Internet messages ultimately intended for a second one of said calling and called devices;

(c) said respective first one of said calling and called device proxy servers being arranged to intercept said messages sent by said first one of said calling and called devices and to resend said messages to said intermediate proxy server, said resent messages bearing said IP address of said respective first one of said calling and called device proxy servers as the source address;

(d) said intermediate proxy server being arranged to receive said Internet messages from said respective first one of said calling and called device proxy servers and to resend said Internet messages to said IP address of said respective second one of said calling and called device proxy servers associated with said second one of said calling and called devices, said resent messages bearing said IP address of said intermediate proxy server as the source address; and (e) said respective second one of said calling and called device proxy servers being arranged to receive said Internet message from said intermediate proxy server, and to resend said Internet message to said second one of said calling and called devices.

27. A system for voice and multimedia communications on the Internet as recited in claim 26, further comprising:

(a) said second one of said calling and called devices being arranged to send Internet messages to said intermediate proxy server, said Internet message ultimately intended for a first one of said calling and called devices;

(b) said respective second one of said calling and called device proxy servers being arranged to intercept said messages sent by said second one of said calling and called devices and to resend said messages to said intermediate proxy server, said resent messages bearing said IP address of said respective second one of said calling and called device proxy servers as the source address;

(c) said intermediate proxy server being arranged to receive said Internet messages from said respective second one of said calling and called device proxy servers and to resend said Internet messages to said IP address of said respective first one of said calling and called device proxy servers associated with said first one of said calling and called devices, said resent messages bearing said IP address of said intermediate proxy server as the source address; and (d) said respective first one of said calling and called device proxy servers being arranged to receive said Internet messages from said intermediate proxy server, and to resend said Internet messages to said first one of said calling and called devices.

28. A system for voice and multimedia communications on the Internet as recited in claim 25, wherein said system provides multi-party bridging between more than two calling and called devices, said system further comprising means for said intermediate proxy server to resend Internet messages received from one of a plurality calling and called devices to the others of said plurality of calling and called devices.

29. A method for integrating the Internet with the PSTN wherein an Internet connection can be created between Integrated Devices, the user of one such device, or the device itself or an agent for the device, having available the telephone number of another Integrated Device, said Integrated Devices having Internet connectivity and having telephone connectivity with an associated telephone number, such that a connection for said Integrated Devices is established by telephonically dialing said telephone number via the Public Switched Telephone Network (PSTN), comprising the steps of:

(a) entering the telephone number of a called Integrated Device into a calling Integrated Device, said called Integrated Device to be communicated with via the Internet;

(b) assigning a temporary Internet Protocol (IP) address to a first one of said calling and called devices;

(c) providing said temporary IP address of said first one of said calling and called devices to a second one of said calling and called devices; and (d) sending an Internet message to said temporary IP address of said first one of said calling and called devices by said second one of said calling and called devices.

30. A method for integrating the Internet with the PSTN as recited by claim 29, wherein the step of assigning said temporary IP address is performed by the PSTN.

31. A method for integrating the Internet with the PSTN as recited by claim 29, wherein the step of providing said temporary IP address of said first one of said calling and called devices to a second one of said calling and called devices is performed by the PSTN.

32. A method for integrating the Internet with the PSTN as recited by claim 29, wherein the step of providing said temporary IP address of said first one of said calling and called devices to a second one of said calling and called devices is performed by the PSTN via a digital messaging capability of the PSTN.

33. A method for integrating the Internet with the PSTN as recited by claim 29, wherein the step of providing said temporary IP address of said first one of said calling and called devices to a second one of said calling and called devices is performed by the PSTN via digital messages sent on the Internet.

34. A method for integrating the Internet with the PSTN as recited by claim 29, further comprising the step of assigning a temporary IP address to a second one of said calling and called devices, and wherein said Internet messages sent to said first one of said calling and called devices by said second one of said calling and called devices bear the temporary IP address of said second one of said calling and called devices as the source address.

35. A method for integrating the Internet with the PSTN as recited by claim 29, further comprising the steps of:

(a) receiving said Internet message sent to said temporary IP address of said first one of said calling and called devices from said second one of said calling and called devices by a first proxy server associated with said first one of said calling and called devices; and (b) resending said Internet message by said first proxy server to said first one of said calling and called devices.

36. A method for integrating the Internet with the PSTN as recited by claim 29, further comprising the steps of:

(a) assigning a temporary IP address to a second one of said calling and called devices;

(b) intercepting said Internet message by a second proxy server which is associated with said second one of said calling and called devices; and (c) resending said Internet message by said second proxy server to said first one of said calling and called devices, wherein said resent Internet message bears the temporary IP address assigned to said second one of said calling and called devices as the source address.

37. A method for voice and multimedia communications on the Internet which provides security for the Internet Protocol (IP) addresses and data transmissions of the calling and called devices, comprising the steps of:

(a) initiating an Internet call by a calling device (caller) to a called device (callee);

(b) providing an IP address of a called device proxy server to said calling device as the IP address of the called device;

(c) sending caller Internet messages by said calling device to said called device proxy server IP address, said messages ultimately intended for said called device;

(d) intercepting said caller Internet messages by said calling device proxy server;

(e) resending said caller Internet messages by said calling device proxy server to said called device proxy server IP address, said resent caller Internet messages bearing said calling device proxy server IP address as the source address;

(f) receiving said caller Internet messages by said called device proxy server;

(g) resending said caller Internet messages by said called device proxy server to said called device;

(h) providing an IP address of a calling device proxy server to said called device as the IP address of the calling device;

(i) sending callee Internet messages by said called device to said calling device proxy server IP address, said messages ultimately intended for said calling device;

(j) intercepting said callee Internet messages by said called device proxy server;

(k) resending said callee Internet messages by said called device proxy server to said calling device proxy server IP address, said resent callee Internet messages bearing called device proxy server IP address as the source address;

(l) receiving said callee Internet messages by said calling device proxy server; and (m) resending said callee Internet messages by said calling device proxy server to said calling device.

38. A method for integrating the Internet with the PSTN wherein an Internet connection can be created between Integrated Devices, the user of one such device, or the device itself or an agent for the device, having available the telephone number of another Integrated Device, said Integrated Devices having Internet connectivity, and having telephone connectivity with an associated telephone number such that a connection for said Integrated Devices is established by telephonically dialing said telephone number via the Public Switched Telephone Network (PSTN), comprising the steps of:

(a) entering the telephone number of a called Integrated Device into a calling Integrated Device, said called Integrated Device to be communicated with via the Internet;

(b) providing an Internet Protocol (IP) address of a proxy server to said calling device as the IP address of the called device;

(c) providing an Internet Protocol (IP) address of a proxy server to said called device as the IP address of the calling device;

(d) sending first Internet messages by a first one of said calling and called devices to said proxy server IP address associated with a second one of said calling and called devices, said messages ultimately intended for said second one of said calling and called devices;

(e) receiving said first Internet messages by said proxy server;

(f) resending said first Internet messages by said proxy server to said second one of said calling and called devices;

(g) sending second Internet messages by said second one of said calling and called devices to said proxy server IP address associated with a first one of said calling and called devices, said second messages ultimately intended for said first one of said calling and called devices;

(h) receiving said second Internet messages by said proxy server; and (i) resending said second Internet messages by said proxy server to said first one of said calling and called devices.

39. A method for integrating the Internet with the PSTN as recited by claim 38, wherein the steps of providing an IP address of a proxy server to said calling device as the IP address of the called device, and of providing an IP address of a proxy server to said called device as the IP address of said calling device, are performed by the PSTN.

40. A method for integrating the Internet with the PSTN as recited by claim 38, wherein the steps of providing an IP address of a proxy server to said calling device as the IP address of the called device, and of providing an IP address of a proxy server to said called device as the IP address of said calling device, are performed by the PSTN via a digital messaging capability of the PSTN.

41. A method for integrating the Internet with the PSTN as recited by claim 38, wherein the steps of providing an IP address of a proxy server to said calling device as the IP address of the called device, and of providing an IP address of a proxy server to said called device as the IP address of said calling device, are performed by the PSTN via digital messages sent on the Internet.

42. A method for voice and multimedia communications on the Internet which provides security for the Internet Protocol (IP) addresses and data transmissions of the calling and called devices, comprising the steps of:

(a) initiating an Internet call by a calling device to a called device;

(b) providing an IP address of a proxy server to said calling device as the IP address of the called device;

(c) providing an IP address of proxy server to said called device as the IP address of the calling device;

(d) sending first Internet messages by a first one of said calling and called devices to said proxy server IP address associated with a second one of said calling and called devices, said messages ultimately intended for said second one of said calling and called devices;

(e) receiving said first Internet messages by said proxy server;

(f) resending said first Internet messages by said proxy server to said second one of said calling and called devices;

(g) sending second Internet messages by said second one of said calling and called devices to said proxy server IP address associated with a first one of said calling and called devices, said second messages ultimately intended for said first one of said calling and called devices;

(h) receiving said second Internet messages by said proxy server; and (i) resending said second Internet messages by said proxy server to said first one of said calling and called devices.

43. A method for integrating the Internet with the PSTN wherein an Internet connection can be created between Integrated Devices, the user of one such device, or the device itself or an agent for the device, having available the telephone number of another Integrated Device, said Integrated Devices having Internet connectivity, and having telephone connectivity with an associated telephone number such that a connection for said Integrated Devices is established by telephonically dialing said telephone number via the Public Switched Telephone Network (PSTN), comprising the steps of:

(a) entering the telephone number of a called Integrated Device (callee) into a calling Integrated Device (caller), said called Integrated Device to be communicated with via the Internet;

(b) providing an Internet Protocol (IP) address of a first intermediate proxy server (IP1) to said calling device as the IP address of the called device;

(c) providing an IP address of a called device proxy server (IP2) to said first intermediate proxy server as the IP address of the called device;

(d) providing an IP address of a calling device proxy server (IP3) to said first intermediate proxy server as the IP address of the calling device;

(e) sending caller Internet messages by said calling device to said first intermediate proxy server IP address (IP1), said messages ultimately intended for said called device;

(f) intercepting said caller Internet messages by said calling device proxy server;

(g) resending said caller Internet messages by said calling device proxy server to said first intermediate proxy server IP address (IP1), said resent caller Internet messages bearing calling device proxy server IP address (IP3) as the source address;

(h) receiving said caller Internet messages by said first intermediate proxy server;
(i) resending said caller Internet messages by said first intermediate proxy server to said called device proxy server IP address (IP2);
(j) receiving said caller Internet messages by said called device proxy server;
(k) resending said caller Internet messages by said called device proxy server to said called device;
(l) providing an Internet Protocol (IP) address of a second intermediate proxy server (IP4) to said called device as the IP address of the calling device;
(m) providing an IP address of a calling device proxy server (IP5) to said second intermediate proxy server as the IP address of the calling device;
(n) providing an IP address of a called device proxy server (IP6) to said second intermediate proxy server as the IP address of the called device;
(o) sending callee Internet messages by said called device to said second intermediate proxy server IP address (IP4), said messages ultimately intended for said calling device;
(p) intercepting said callee Internet messages by said called device proxy server;
(q) resending said callee Internet messages by said called device proxy server to said second intermediate proxy server IP address (IP4), said resent callee Internet messages bearing called device proxy server IP address (IP6) as the source address;
(r) receiving said callee Internet messages by said second intermediate proxy server;
(s) resending said callee Internet messages by said second intermediate proxy server to said calling device proxy server IP address (IP5);
(t) receiving said callee Internet messages by said calling device proxy server; and
(u) resending said callee Internet messages by said calling device proxy server to said calling device.

44. A method for integrating the Internet with the PSTN as recited by claim 43, wherein the functions of said first and second intermediate proxy servers are provided by a single device, and the associated IP addresses (IP1 and IP4) are the same.

45. A method for integrating the Internet with the PSTN as recited by claim 43, wherein the steps of providing IP addresses are performed by the PSTN.

46. A method for integrating the Internet with the PSTN as recited by claim 43, wherein the steps of providing IP addresses are performed by the PSTN via a digital messaging capability of the PSTN.

47. A method for integrating the Internet with the PSTN as recited by claim 43, wherein the steps of providing IP addresses are performed by the PSTN via digital messages sent on the Internet.

48. A method for voice and multimedia communications on the Internet which provides security for the Internet Protocol (IP) addresses and data transmissions of the calling and called devices, comprising the steps of:
(a) initiating an Internet call by a calling device (caller) to a called device (callee);
(b) providing an IP address of a first intermediate proxy server (IP1) to said calling device as the IP address of the called device;
(c) providing an IP address of a called device proxy server (IP2) to said first intermediate proxy server as the IP address of the called device;
(d) providing an IP address of a calling device proxy server (IP3) to said first intermediate proxy server as the IP address of the calling device;
(e) sending caller Internet messages by said calling device to said first intermediate proxy server IP address (IP1), said messages ultimately intended for said called device;
(f) intercepting said caller Internet messages by said calling device proxy server;
(g) resending said caller Internet messages by said calling device proxy server to said first intermediate proxy server IP address (IP1), said resent caller Internet messages bearing calling device proxy server IP address (IP3) as the source address;
(h) receiving said caller Internet messages by said first intermediate proxy server;
(i) resending said caller Internet messages by said first intermediate proxy server to said called device proxy server IP address (IP2);
(j) receiving said caller Internet messages by said called device proxy server;
(k) resending said caller Internet messages by said called device proxy server to said called device;
(l) providing an Internet Protocol (IP) address of a second intermediate proxy server (IP4) to said called device as the IP address of the calling device;
(m) providing an IP address of a calling device proxy server (IP5) to said second intermediate proxy server as the IP address of the calling device;
(n) providing an IP address of a called device proxy server (IP6) to said second intermediate proxy server as the IP address of the called device;
(o) sending callee Internet messages by said called device to said second intermediate proxy server IP address (IP4), said messages ultimately intended for said calling device;
(p) intercepting said callee Internet messages by said called device proxy server;
(q) resending said callee Internet messages by said called device proxy server to said second intermediate proxy server IP address (IP4), said resent callee Internet messages bearing called device proxy server IP address (IP6) as the source address;
(r) receiving said callee Internet messages by said second intermediate proxy server;
(s) resending said callee Internet messages by said second intermediate proxy server to said calling device proxy server IP address (IP5);
(t) receiving said callee Internet messages by said calling device proxy server; and
(u) resending said callee Internet messages by said calling device proxy server to said calling device.

49. A method for voice and multimedia communications on the Internet as recited by claim 48, wherein the functions of said first and second intermediate proxy servers are provided by a single device, and the associated IP addresses (IP1 and IP4) are the same.

* * * * *